US010732271B2

(12) United States Patent
Felber

(10) Patent No.: US 10,732,271 B2
(45) Date of Patent: Aug. 4, 2020

(54) EFFICIENT, HIGH-POWER MECHANICAL TRANSDUCERS FOR ACOUSTIC WAVES IN DENSE MEDIA

(71) Applicant: STARMARK, INC., San Diego, CA (US)

(72) Inventor: Franklin S. Felber, San Diego, CA (US)

(73) Assignee: STARMARK, INC.

( * ) Notice: Subject to any disclaimer, the term of this patent is extended or adjusted under 35 U.S.C. 154(b) by 221 days.

(21) Appl. No.: 15/908,019

(22) Filed: Feb. 28, 2018

(65) Prior Publication Data

US 2018/0188363 A1 Jul. 5, 2018

Related U.S. Application Data

(63) Continuation of application No. 14/250,223, filed on Apr. 10, 2014, now abandoned.

(51) Int. Cl.
*G01S 7/521* (2006.01)
*G01S 15/04* (2006.01)
*G01S 15/87* (2006.01)
*G01V 1/02* (2006.01)

(52) U.S. Cl.
CPC .............. *G01S 7/521* (2013.01); *G01S 15/04* (2013.01); *G01S 15/87* (2013.01); *G01V 1/02* (2013.01); *Y02E 10/38* (2013.01)

(58) Field of Classification Search
CPC .......... G01S 7/521; G01S 15/87; G01S 15/04; G01V 1/02; Y02E 10/38
See application file for complete search history.

(56) References Cited

U.S. PATENT DOCUMENTS

| 2,346,655 | A | * | 4/1944 | Benioff | G01S 7/521 367/175 |
| 3,461,970 | A | * | 8/1969 | Bodine | A01B 11/00 172/1 |
| 5,274,608 | A | * | 12/1993 | Graham | B06B 1/0618 367/131 |
| 5,483,502 | A | * | 1/1996 | Scarpitta | B06B 1/0618 310/334 |

(Continued)

*Primary Examiner* — Daniel Pihulic
(74) *Attorney, Agent, or Firm* — Gary L. Eastman, Esq.; Eastman McCartney Dallman LLP

(57) ABSTRACT

Mechanical transducers efficiently produce and couple high-power acoustic pulses into liquid and solid media. In a transmitter, mechanical excitation of a thin transmitting plate is provided by an actuator or a motor that causes a mass to strike or a drive rod to push the thin plate. If struck, as the thin plate rings down, it delivers much of its kinetic energy to acoustic radiation in the dense medium. Different mechanisms may be used to excite the plate, and different mechanisms may be used to couple the plate excitations into dense media. Conditions are found for efficient transduction of mechanical energy by a thin plate into acoustic radiation in solid and liquid media. A receiver comprises a plate having matching resonances to the transmitting plate. Discrete narrowband frequencies of acoustic signals are used to detect phase changes in waves reflected from a moving object. By interfering successive return pulses, small changes in phase and amplitude within the reflected beam lead to large changes in interfering voltage waveforms.

33 Claims, 23 Drawing Sheets

(56) References Cited

U.S. PATENT DOCUMENTS

| | | | | |
|---|---|---|---|---|
| 5,978,316 | A * | 11/1999 | Ambs | H04B 11/00 367/134 |
| 7,364,008 | B2 * | 4/2008 | Rau | G01V 1/143 181/108 |
| 8,228,762 | B2 * | 7/2012 | Greig | G01V 1/02 367/189 |
| 9,308,554 | B2 * | 4/2016 | Campbell | B06B 1/0614 |
| 2014/0269210 | A1 * | 9/2014 | Bagshaw | H04B 11/00 367/140 |
| 2015/0293213 | A1 * | 10/2015 | Felber | G01S 7/521 367/3 |
| 2016/0124097 | A1 * | 5/2016 | Laro | G01V 1/155 367/190 |
| 2018/0188363 | A1 * | 7/2018 | Felber | G01S 7/521 |

* cited by examiner

EFFICIENT, HIGH-POWER MECHANICAL TRANSDUCERS FOR ACOUSTIC WAVES IN DENSE MEDIA

CROSS REFERENCE TO RELATED APPLICATION

This application claims priority to, and is a Continuation of U.S. non-provisional patent application Ser. No. 14/250,223, entitled EFFICIENT, HIGH-POWER MECHANICAL TRANSDUCERS FOR ACOUSTIC WAVES IN DENSE MEDIA, filed on Apr. 10, 2014 and is hereby incorporated by reference in its entirety.

BACKGROUND OF THE INVENTION

Field of the Invention

The present subject matter relates to acoustic transducers comprising mechanical transmitters and matched resonant receivers and apparatus including the transducers.

Background

A conventional form of signal generation comprises an electronic signal generator coupled to drive a vibrating member in a manner similar to that in which a loudspeaker is driven. An example of this form of construction is illustrated in U.S. Pat. No. 7,185,447. The conventional construction of this type of acoustic wave generator has signal output power less than input power. Use of such embodiments does not allow pulse compression, that is, production of high acoustical power with much lower input power.

A mechanical generator may be preferred. U.S. Pat. No. 5,274,608 discloses a diaphragm in contact with water that is coupled to a mass in a cylinder for excitation. The diaphragm is vibrated by the motion of a piston coupled to the diaphragm by springs. The frequency must be regulated by means independent of the diaphragm.

U.S. Pat. No. 5,483,502 discloses what it characterizes as a high power acoustic wave emitter. The vibrating member that produces acoustic waves is included in a submerged housing rather than facing the water on one side and being coupled to a source of motive power on the other side.

United States Published Patent Application Number 2012/0163126 discloses a vibrator body comprising a composite material for generating and/or receiving ultrasonic or acoustic waves. By forming the vibrator body into a composite, the lateral mode is suppressed and the performance in the thickness direction significantly improves. This structure provides for a particular vibrational mode. However, mode of excitation cannot be selected once the vibrator body is configured.

Sonar transducer apparatus may also be used in a torpedo decoy. U.S. Pat. No. 4,216,534 discloses a torpedo decoy apparatus which generates a range of frequency of acoustic signals designed to attract homing torpedoes. However, this apparatus must use preselected frequencies rather than responding to a frequency transmitted by a torpedo.

An acoustic means of through-wall surveillance (TWS) and tracking was discussed in N. C. Wild, F. S. Felber, M. Treadaway, F. Doft, D. Breuner, and S. Lutjens, "Ultrasonic through-the-wall surveillance system," in *Technologies for Law Enforcement*, Edward M. Carapezza, Ed., Proc. SPIE 4232, Paper 4232-29 (2000). It was found that commercial off-the-shelf (COTS) ultrasound transducers placed against a solid barrier produced an echo from the other side of the barrier that changed when someone moved behind the barrier. Then by subtracting successive echo pulse waveforms, the difference waveform, through destructive interference, revealed only those persons or objects that moved between pulses; the echo pulse waveforms returned from stationary objects canceled each other. The round-trip time of each pulse returned to a receiver from a moving person or object indicated its range, and triangulating the ranges to multiple receivers indicated its location.

Acoustic TWS, and particularly handheld and portable systems, have advantages over alternative TWS technologies. The primary alternatives to acoustic TWS since the mid-1990s have been radar-microwave and passive millimeter-wave sensors. Other sensor technologies, like infrared sensors, could image weapons concealed on a body beneath clothing, but could not image through walls. Passive millimeter-wave sensors required illumination of the targets by millimeter-wave radiation from the sky, which effectively limited their applicability to finding persons in areas open to the sky. Radar-microwave sensors, like the Hughes Motion Detection Radar, differential radar, radar 'flashlight,' Time Domain's RadarVision and SoldierVision, and Livermore National Laboratory's Urban Eyes, were limited by attenuation in walls to long microwave wavelengths, typically S band and longer, which did not allow detection of the millimeter-scale motions of stationary persons. More significantly, radar sensors could not penetrate metal or metal-lined walls or even the aluminum-backed fiberglass insulation typically found in homes and buildings.

SAIC's Vehicle and Cargo Inspection System (VACIS®) is designed to penetrate 15 cm of steel and image the entire contents of cargo containers and trailer trucks, but the system elements must be big enough to span the trucks and cargo containers it scans. Also, highly ionizing gamma radiation is not allowed for use on humans in TWS applications, although it does image humans through thick steel walls very well.

The foremost advantage of acoustic TWS is that sound penetrates metal walls almost as well as other wall materials, and does so with harmless non-ionizing radiation. Another significant advantage is that acoustic TWS is sensitive to motions smaller than $\frac{1}{10}$ of a wavelength. Because the signal processing destructively interferes successive waveforms with each other, a movement on the scale of one wavelength will produce an interference waveform comparable in signal strength to the successive echo waveforms themselves. But even a movement on a scale less than about $\frac{1}{10}$ of a wavelength can produce interference waveforms having a good fraction of the signal strength of the echoes.

Transducers offering advantages of high acoustic pulse power with low electrical input power, high efficiency, light weight, compact size, low cost, low-voltage long-duration battery operation could be as attractive for underwater systems as for TWS. Underwater transducers are reviewed in C. H. Sherman and J. L. Butler, *Transducers and Arrays for Underwater Sound* (Springer, N Y, 2007). Underwater transducers in a high-power performance range are costly primarily because of the high-voltage, high-power amplifier and power conditioning systems that are needed to drive them. Signal generation and power amplifier systems for conventional transducers involve substantial hardware. Typically, a low-level arbitrary waveform synthesizer, digitally generated and then D/A converted, has its output amplified by a high-power amplifier and coupled to the transducer load using a matching network. One of the more efficient amplifiers that can reproduce arbitrary waveforms is a pulse width modulation (PWM) design. These power amplifier systems are available commercially, as are PWM amplifiers themselves.

SUMMARY

Briefly stated, in accordance with the present subject matter, there are provided a transducer and apparatus comprising the transducer which are particularly suited for transmitting and receiving acoustic signals through dense media. A transmitter utilizes mechanical excitation of a thin plate. In one embodiment, the mechanical excitation is provided by an actuator that propels a mass at the thin plate. After being struck, the thin plate then rings down, delivering much of its kinetic energy to acoustic radiation in the dense medium. Different mechanisms may be used to excite the plate.

The receiver comprises a plate having matching resonances to the transmitting plate. The receiving plate is the same as, or substantially a duplicate of, the transmitting plate. Vibration of the receiving plate is sensed. Preferred sensors are piezoelectric film sensors secured to the receiving plate with an adhesive. The piezoelectric sensors transmit received signals to processing circuitry.

This construction provides for high-power mechanical transducers for dense media. A mechanical impulse or mechanical pusher in a transmitter induces an oscillation of a source to produce an oscillation of a dense medium at an interface. Oscillation may be produced by resonant impact transmitters with matched resonant receivers, and also by tunable nonresonant direct-drive transmitters.

Mechanical transducers may utilize pulse compression. More specifically, mechanical energy is stored at low power over a long time, such as by slowly compressing a spring. The mechanical energy is released suddenly at high power by releasing compressive forces on the spring. For example, less than 1 W of electrical input can produce 50 W of acoustic output.

An important physical principle is that a properly designed thin plate transduces a mechanical impulse to acoustic energy in a dense medium with high efficiency at the resonant mode frequencies of the plate.

Apparatus comprising the transducer may comprise, for example, a through-wall sensor or a sonobuoy that can autonomously perform long-duration underwater surveillance. Apparatus for other applications requiring transmission or reception of acoustic waves may also be provided.

There is a need to couple efficiently the acoustic energy produced by a transmitter into the dense media of water or solid walls, for example. Designs of transmitter plates and efficient means for transmitters to couple their kinetic energy of oscillations into acoustic power transmitted into dense media are described.

In implementing the present subject matter, a tunable mechanical transmitter was developed that, operating on a single 9-V battery, was capable of transmitting more acoustic power into a wall than a heavier COTS transmitter operating at 1800 volts peak-to-peak. Besides tunability, therefore, a significant advantage of this mechanical transmitter was safety. In another implementation, a narrowband mechanical transmitter, driven by a 35-W motor, was able to detect motion of a person through two thick walls and over 6 meters, even without the additional 26-dB of signal-to-noise improvement that could have been achieved in signal processing with a narrowband filter/amplifier.

BRIEF DESCRIPTION OF THE DRAWINGS

The present subject matter may be further understood by reference to the following description taken in connection with the following drawings.

DETAILED DESCRIPTION

The present subject matter comprises mechanical transducers that are particularly well suited for efficiently and inexpensively producing and coupling high-power acoustic pulses into dense media, like walls and water. Advantages of an acoustic TWS sensor and its signal processing include high-resolution locating and tracking, portability, low cost, quick and easy preparation and deployment, near-real-time data processing and display, and no damage or changes to the wall.

One significant application of the present subject matter is in through-wall surveillance (TWS). Advantages of acoustic TWS over radar TWS include detection through metal and metal-lined walls and detection of stationary persons through walls.

The present subject matter overcomes the shortcomings of prior TWS sensors that can detect only moving persons, giving a user false confidence that all persons on the other side of a wall are accounted for. This can make a life-or-death difference in military or law enforcement operations.

The present subject matter uses discrete narrowband frequencies to detect phase changes in waves reflected from a moving person. By interfering successive return pulses, small changes in phase and amplitude within the reflected beam lead to large changes in received voltage waveforms. This allows detection of mm-scale motion by cm-scale wavelengths. It has been found that detecting the mm-scale motion of persons who are breathing but otherwise stationary should be performed using narrowband frequencies.

Another significant application of the present subject matter is in long-duration surveillance by sonobuoys. Underwater impact transducers are particularly well suited for undersea surveillance by a networked system of fixed autonomous sonobuoy nodes (FASNs) near harbors, bays, and sensitive shoreline installations.

The present subject matter comprises a transducer apparatus particularly suited for providing low-cost, high-power acoustic wave generators and receivers for processing sound waves coupled through dense media. While the present subject matter is not so limited, it provides particular advantages in the context of high-density media. Examples of high-density media include seawater and steel walls.

Many different applications may be implemented through use of the present subject matter. Particularly useful applications include sonobuoys providing long-duration surveillance in and near harbors and other littoral waters. Another application is sensing of moving objects through the wall of a cargo container or the like. Two exemplary applications are illustrated. However, many other applications are available.

Figure 1:
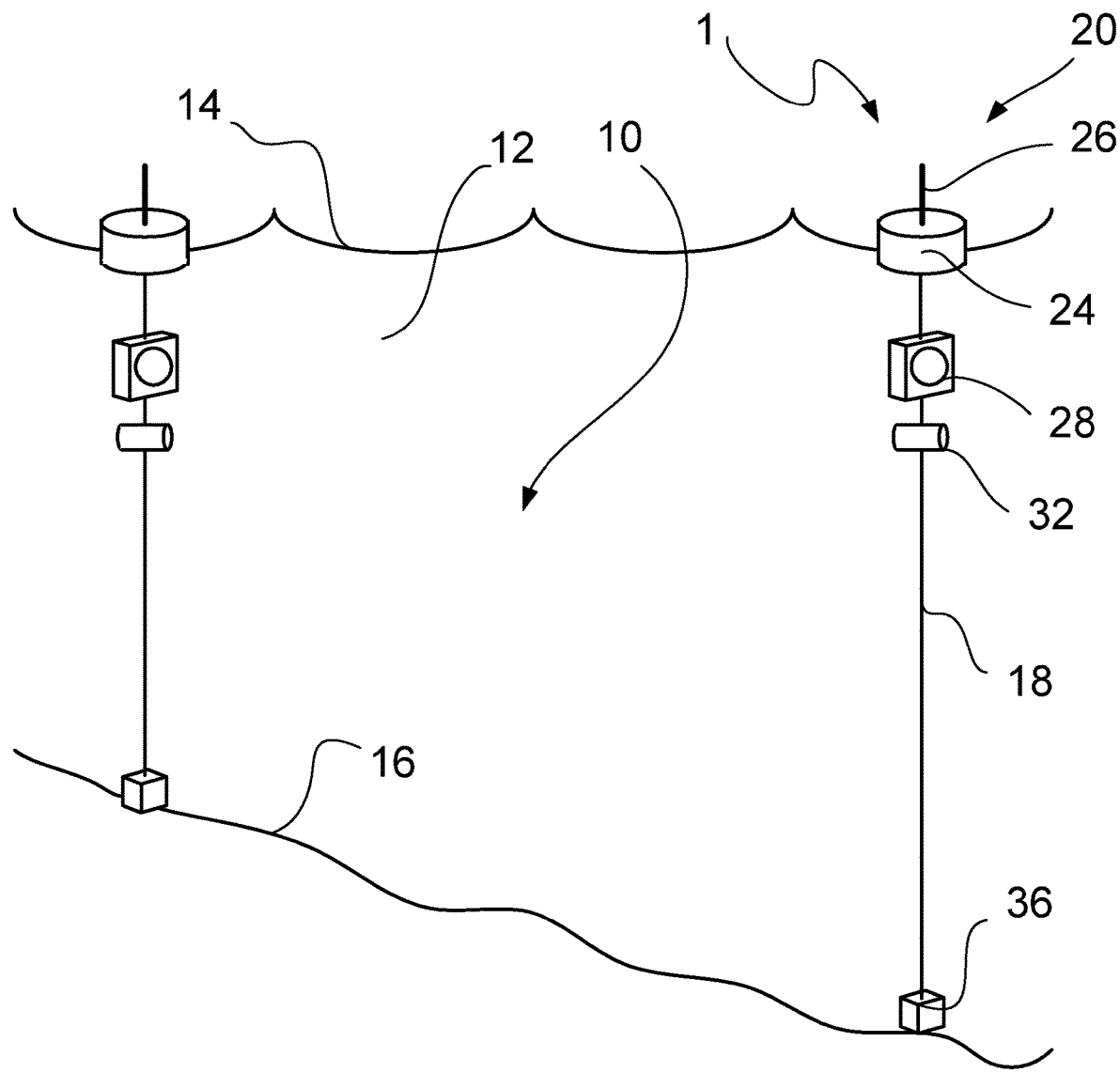
FIG. 1 is an illustration of a deployed sonobuoy comprising a transducer apparatus.

The Figures describe a variety of devices. FIG. 1 is an illustration of the transducer apparatus 1 comprising a sonobuoy 20. The sonobuoy 20 is disposed in a medium 10 such as a body of water 12 having a water surface 14 and a bottom 16. The sonobuoy 20 includes a buoy 24 which floats on the water surface 14 or at some height above the bottom 16 and is anchored to an anchor 36 resting on the bottom 16. A tether 18 secures the sonobuoy 20 to the anchor 36. The sonobuoy 20 includes a communications antenna 26. A sonar head 28 is suspended in the water 12 beneath the buoy 24. The sonar head 28 is electrically coupled to the antenna 26 and mechanically supported to the buoy 24 at a fixed distance below the buoy 24. A tension reel 32 attached to the tether 18 continually adjusts the length of the tether 18 to accommodate the motion of the water 12. Consequently, the buoy 24 remains substantially in horizontal registration with the position of the anchor 36. Further details of the sonobuoy 20, its components, and operation are discussed below.

Figure 2:
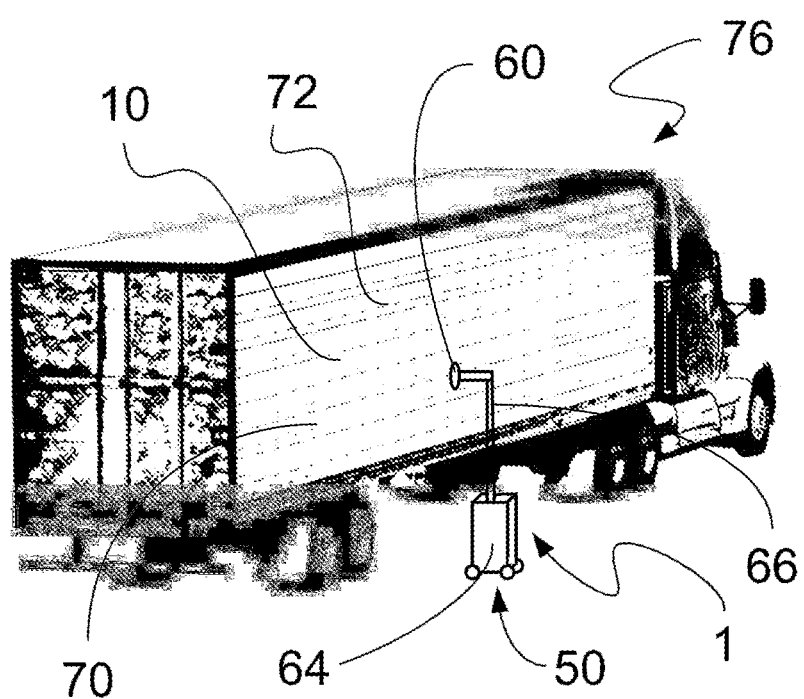
FIG. 2 is an illustration of a transducer apparatus used as a through-wall detector.

FIG. 2 is an illustration of the transducer apparatus 1 comprising a through-wall detector apparatus 50. The detector apparatus 50 comprises a transducer head 60 coupled to a power supply, propulsion, and communications and processing module 64. In operation the transducer head 60 is positioned at a wall 72 of a container 70 by a support 66. The wall 72 in a nominal application is a steel wall 72. The container 70 may be mounted on a truck 76 and may comprise a cargo container or the cargo area of the truck 76.

Figure 3:
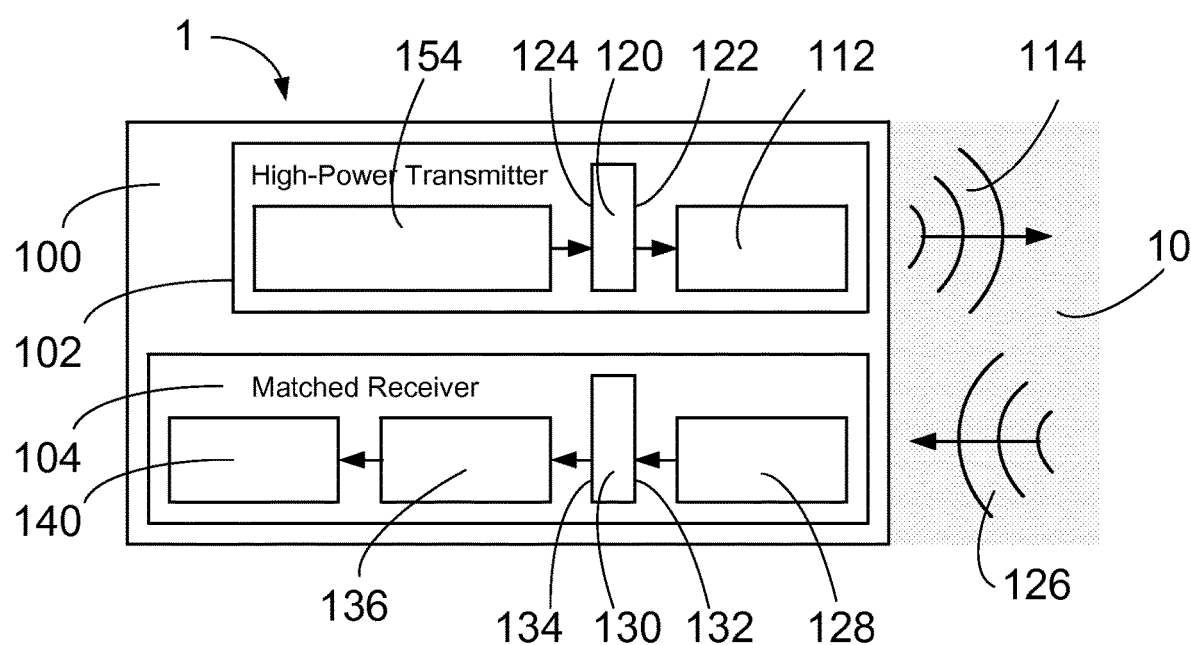
FIG. 3 is a block diagram of a transducer apparatus coupled to a medium.
Figure 4:
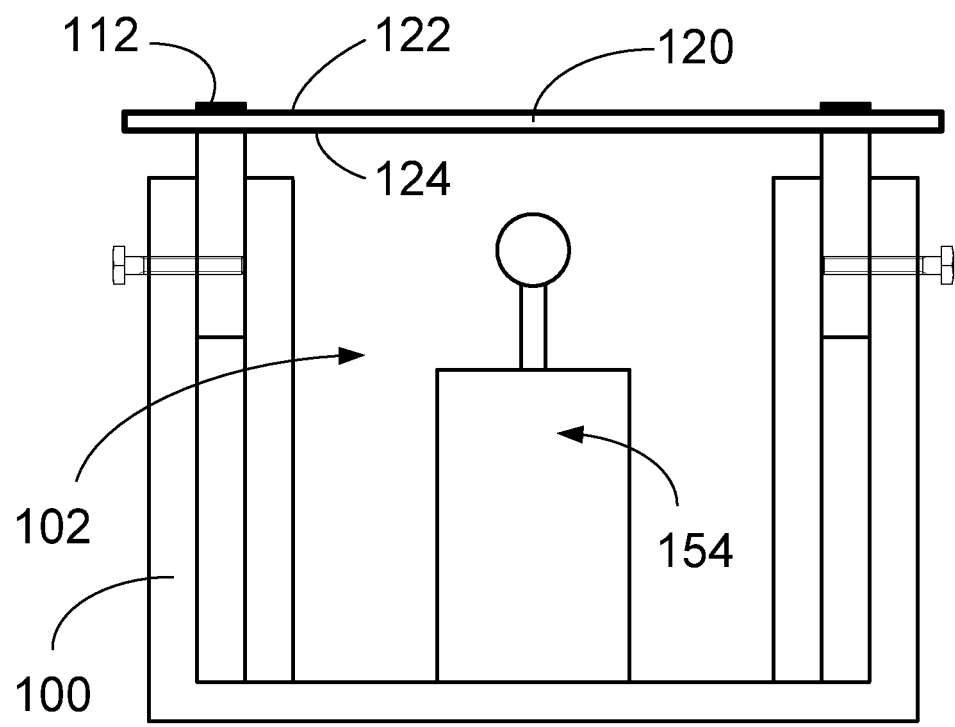
FIG. 4 is a side view of a transducer apparatus illustrating a transmitter.
Figure 5:
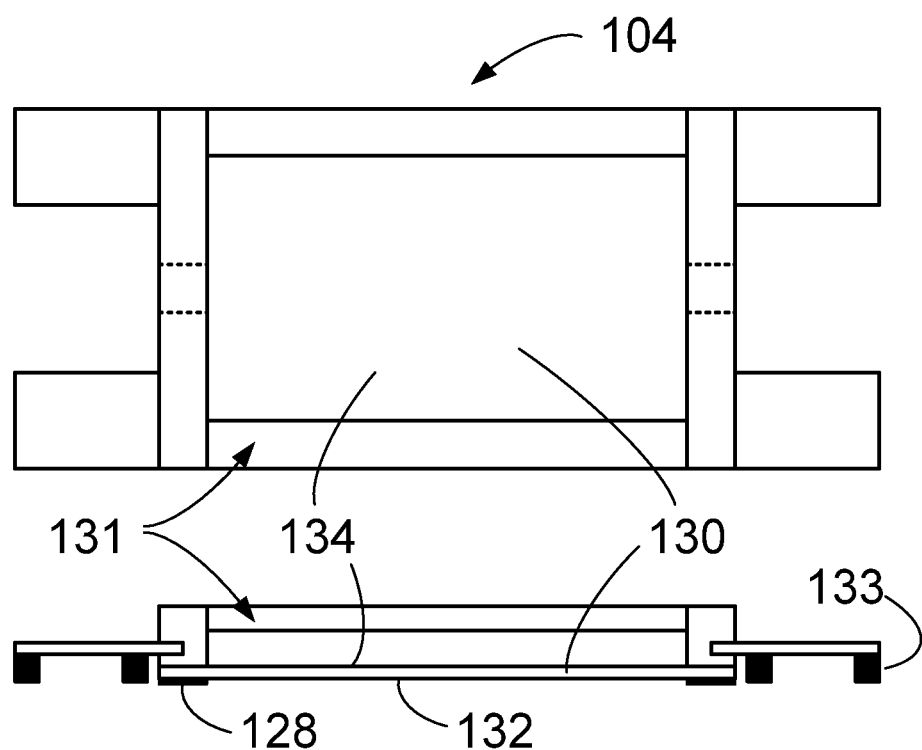
FIG. 5 is a top view and side view of a transducer apparatus illustrating a receiver.

FIGS. 3, 4, and 5 are discussed together. The same reference numerals denote the same components. FIG. 3 is a block diagram of the transducer apparatus 1 illustrating one embodiment of a concept. FIG. 4 is a side view of the transducer apparatus 1 illustrating the transmitter 102. FIG. 5 is a top view and side view of the transducer apparatus 1 illustrating the receiver 104.

FIG. 3 is shown as a discrete unit solely for the purposes of the present discussion. In selected preferred embodiments, the transmitter and receiver need not be in the same enclosure. It is not essential for the transmitter and receiver to be collocated.

A housing 100 is provided. In the present illustration, a housing 100 comprises a rectangular parallelepiped. However, it is not essential for the housing 100 to have any particular shape. It is not essential that the housing 100 include one enclosure. Where the housing 100 comprises more than one enclosure, the enclosures may be placed at separate locations. A transmitter 102 and a receiver 104 are mounted in the housing 100. The transmitter 102 comprises a plate driver 154 and a transmitting plate 120, which produces acoustic waves to be propagated into the medium 10. The transmitter 102 also comprises a means 112 of coupling the plate 120 to the medium 10, and a means of causing the plate to vibrate, further described below. Because the normal-mode frequencies of a plate of a given size and shape are roughly proportional to the sound speed in the plate, and the weight is proportional to the density, the plate 120 is preferably comprised of a material with a high sound speed and a low density. The material strengths and hardness are preferably high to withstand many impacts. Aluminum and titanium are preferred materials. Copper, steel, or nickel could be used.

The transmitting coupler 112 couples acoustic waves 114 to the medium 10. In transmitting to a solid surface, such as the wall 72 in FIG. 2, the transmitting coupler 112 may comprise spacers to maintain a thin gap between the transmitting plate 120 and the wall 72. A thin gap is preferred. In the embodiment of FIG. 2, the transmitting coupler 112 effectively utilizes the wall 72 as a sound board. In the embodiment of FIG. 1, the transmitting coupler 112 may comprise a surface of the transmitting plate 120. More than one transmitting plate 120 may be provided.

Each transmitting plate 120 has a transmitting front surface 122 and a transmitting rear surface 124. The terms "front" and "rear" are arbitrary. The transmitting front surface 122 faces the medium 10. The transmitting rear surface 124 faces the plate driver 154.

Received waves 126 are coupled from the medium 10 by a receiving coupler 128. In the embodiment of FIG. 2, the receiving coupler 128 may comprise a solid bridging material that indirectly transfers acoustic vibrations from the medium 10 to the receiving plate 130. In the embodiment of FIG. 1, the receiving coupler 128 may comprise a surface of the receiving plate 130.

Each receiving plate 130 has a front receiving surface 132 and a rear receiving surface 134. The terms "front" and "rear" are arbitrary. The front receiving surface 132 faces the medium 10. The rear receiving surface 134 has receiver sensors 136 monitoring the surface as by laser vibrometers that are not affixed. The receiver sensors 136 are preferably piezoelectric film sensors adhesively affixed to the rear receiving surface 134.

A selectable number of receiver sensors 136 respond to oscillations in each receiving plate 130 to provide output signals indicative of the received waves 126. The output signals from the receiver sensors 136 are coupled to a signal processor 140.

Within the transducer head or heads 60 (FIG. 2) the receiving plate 130 differs from the transmitting plate 120 in that it does not need to be attached to a more massive structure like the transmitter. The transmitting plate 120 should be acoustically isolated from the housing or housings, 100, and the transmitter 102 structure in the housing 100. In this manner, resonances of the transmitter structure do not couple to and affect the resonances of the transmitting plate 120. This isolation may be accomplished by using rubber acoustic isolators 133. Both the transmitting plate 120 and the receiving plate 130 may be supported by a rigid support frame 131.

Figure 6:
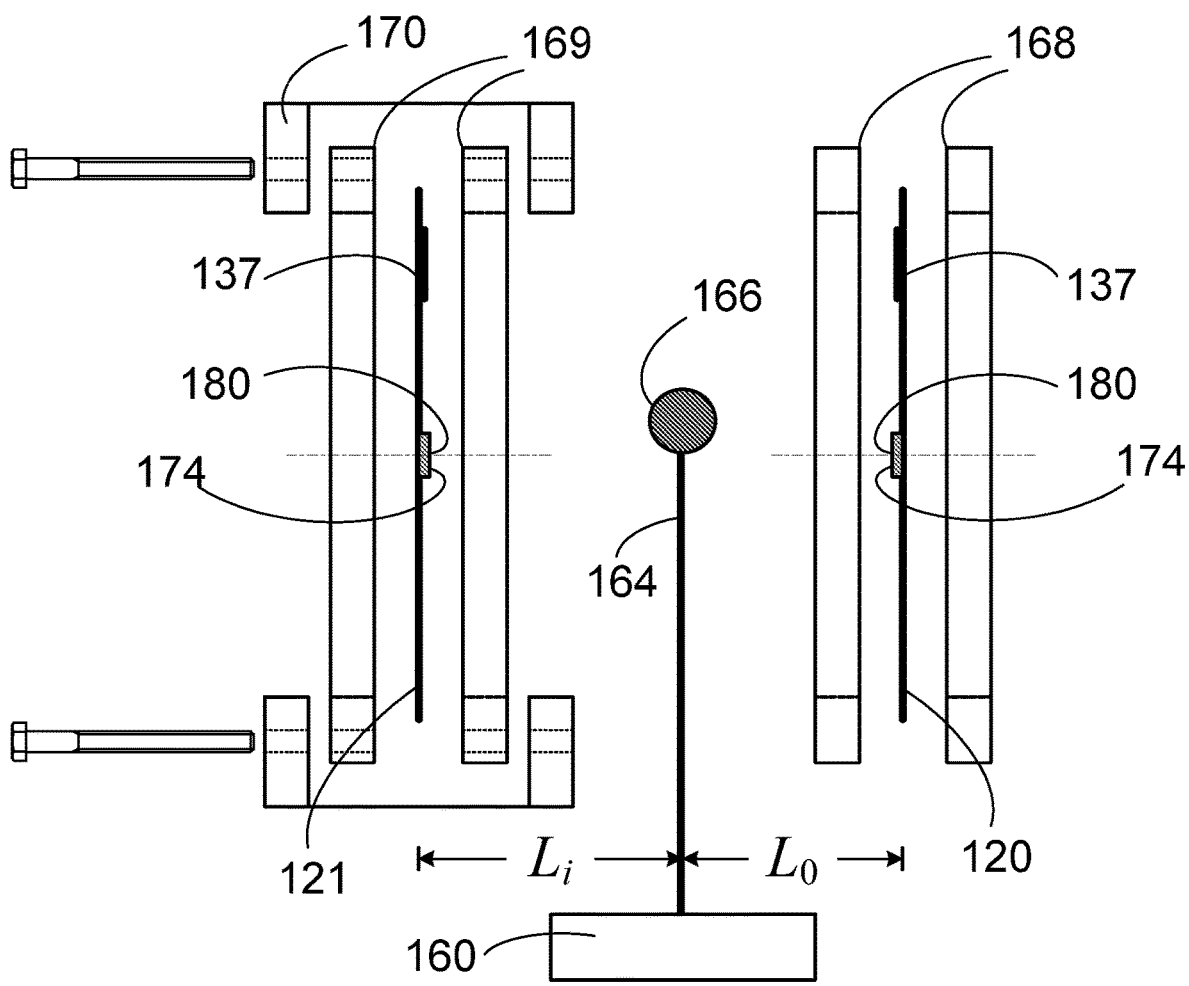
FIG. 6 is an elevation of one embodiment of a plate driver.

FIG. 6 is the elevation of a dual-plate impact-transmitter design including a first transmitting plate 120 and a second transmitting plate 121. The first and second transmitting plates 120 and 121 are mounted in first and second frames 168 and 169 respectively. In this embodiment, the plates 120 and 121 combine to produce a unique double-pulse signature while each provides signals at equal or substantially equal frequencies, bandwidths, and pulse widths. Impact transmitters have a sharply defined pulse start time, t=0. Piezoelectric film sensors 137 affixed to the transmitting plates 120 and 121 register a sharply defined voltage spike at the moment t=0 of impact of the impactor 166 on the first transmitting plate 120 and at the moment of impact of the impactor 166 on the second transmitting plate 121. By this method, the jitter Δt in determining the moment of impact on each plate is very much smaller than a wave period, and generally could be no more than one voltage sampling time. The high precision to which the moment of impact on each plate is known can be used in the following way to assign a unique pulse signature to each dual-plate fixed autonomous sonobuoy node (FASN) sonar head after it has been manufactured.

A prime mover 160 produces motion of the impactor 166 mounted on a stalk 164. The prime mover 160 causes the impactor 166 to strike the first plate 120. The prime mover 160 then causes the impactor 166 to strike the second plate 121. The offset distance of the impactor 166 to the second plate 121, shown as $L_i$ in FIG. 6, is adjustable. Either the position of the second plate can be adjusted by means of a sliding mount 170, or the impactor position between two fixed plates can be adjusted. When $L_i$ is changed, the difference in the pulse start times of the two plates 120 and 121 is changed. Since the pulse start time at each plate is known to high precision, the difference in the times is also known precisely and can be used to identify the source in a network of many such FASNs.

Each thin plate 120 and 121 could have a button, called an anvil 174, affixed to it. The anvil 174, which is preferably steel, has several purposes. It protects the thin plate from potentially hundreds of thousands of impacts of the impactor 166 to be expected during the lifetime of the plate. The impactor 166 and stalk 164 together are referred to as the 'hammer'. A substantially elastic collision of the anvil 174 with the impactor 166, which is also preferably steel, is provided. The anvil may help to put more of the impactor kinetic energy into exciting the desired mode of oscillation and less into parasitic modes, if the hammer strikes slightly off the intended strike point.

In one illustration for the baseline design of a network of hundreds of 1-kHz FASNs, the sampling rate of the receiver signal processing is 32 samples per ms. The difference in start times of the pulses from each of the two faces, therefore, may be known to within about 30 μs. The offset $L_i$ is adjustable over about 1 cm. The velocity of the impactor 166 upon impact is of the order of 1 m/s. That means the difference in pulse start times at the two plates 120 and 121 can vary over about 10 ms as $L_i$ is adjusted over the 1-cm adjustable range. In this example, of the order of 300 uniquely distinguishable offset positions of the second plate are available over the 1-cm adjustable range. The adjustments on the FASNs can be made either by dialing in random offsets $L_i$ or by fine positioning by means of a micro-positioning knob, similar to a micrometer, controlling a worm-screw drive.

Upon producing a double pulse, a FASN may transmit to either a relay buoy or to a central station a signal conveying its location and the time difference between the start of its two pulses. Any FASN receiver that receives this double pulse and then a short time later receives a double pulse reflected off a target, such as a submarine, could then transmit a signal conveying its own location and the times of receiving the pairs of double pulses. From this information, the range of the target to the receiver may be determined. If at least two FASNs in the network report a detection, then the position of the target can be determined by triangulation.

This method of identifying the source depends upon both pulses from a single FASN reflecting from a target and being received at any other FASN in the network. That means the method depends upon the impact transmitters being essentially simple sources with nearly isotropic radiation patterns from each plate.

The transmitting plate 120 is struck by the impactor 166. In order to facilitate interaction between the transmitting plate 120 and the impactor 166, the anvil 174 is placed on the rear surface 124 of the first transmitting plate 120 and on the rear surface 124 of the second transmitting plate 121. The anvil 174 may be affixed to the point of impact 180 on the transmitting plate 120 to protect, regularize, and enhance the elasticity of the point of impact 180. The points of impact 180 and the anvils 174 may be positioned at various locations on the transmitting plates 120 and 121 depending on the modes of vibration to be induced, as further described with respect to FIG. 9 below.

Figure 7A:
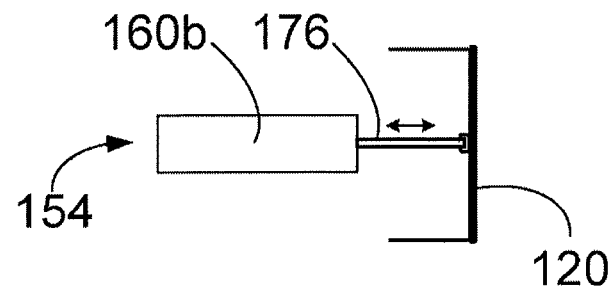
FIG. 7, consisting of FIGS. 7A, 7B, 7C, and 7D, illustrates different embodiments of plate drivers.
Figure 7B:
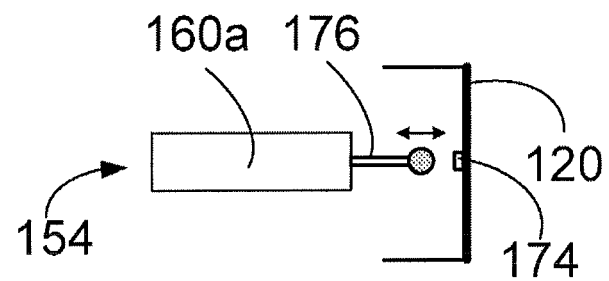
Figure 7C:
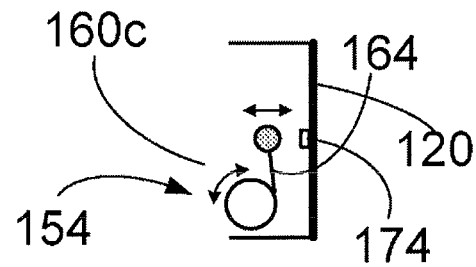
Figure 7D:
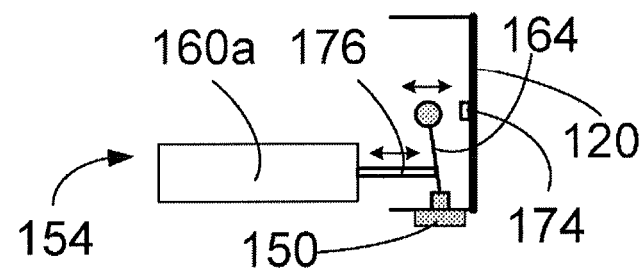

FIG. 7, consisting of FIGS. 7A, 7B, 7C, and 7D, illustrates different embodiments of plate drivers 154. Each of FIGS. 7A, 7B, 7C, and 7D is a mechanical schematic elevation. FIG. 7A corresponds to a conventional embodiment of a loudspeaker driven by a linear induction motor 160b. FIG. 7B corresponds to the embodiment of an actuator 160a illustrated in FIGS. 4 and 8a. FIG. 7C could correspond to the embodiment of an oscillator motor 160c driving the impact transmitter illustrated in FIG. 6. FIG. 7D could correspond to the embodiment of the actuator 160a driving the impact transmitter illustrated in FIG. 6. The prime mover 160 in FIG. 6 could comprise an oscillating actuator 160c, as in FIG. 7C, or a leveraged actuator, as in FIG. 7D. In the embodiments of FIGS. 7A, 7B, 7C, and 7D the prime mover 160 could comprise an electromechanical or electromagnetic actuator or linear induction motor.

In FIG. 7A, the prime mover 160, linear induction motor 160b or otherwise, is directly coupled to the transmitting plate 120 to provide tunable direct drive, in a manner similar to a loudspeaker drive. This embodiment can produce complex acoustic waveforms having characteristics of voice or music. The principal disadvantage of direct drive in this context is that the displacement of the oscillating surface of the plate limited to the stroke of the motor. However, direct drive of the thin plate 120 by the linear induction motor 160b at a variable position on the plate 120 that preferentially excites a desired mode of oscillation at a desired frequency can be an efficient means of producing 'tunable' narrow-band pulse radiation, particularly under water or in other liquid media. For example, if the linear induction motor 160b drives the plate 120 at the resonant frequency of the dipole mode of the plate 120 and at a radial position on the plate at which the dipole mode mode amplitude is greatest, the motor 160b can cause the dipole oscillation amplitude to grow exponentially, and the radiated power at the dipole mode frequency to grow exponentially in power, subject to the limitations of the quality factor of the dipole mode. By reciprocation in the linear induction motor 160b, the same direct-drive mechanism that produces the tunable but resonant narrow-band radiation can be used to receive the reflected pulse radiation.

As seen in FIG. 7B, the actuator 160a moves the impactor 166 in a reciprocating, linear motion to periodically strike the transmitting plate 120 and recoils to permit vibration of the transmitting plate 120. In the embodiment of FIG. 7D, the impactor 166 is pivotally mounted to a base 150. A drive rod 176 coupled to the stalk 164 is moved in a reciprocating, linear motion to cause the impactor 166 to strike the transmitting plate 120 and then to remove the impactor 166 from engagement with the transmitting plate 120.

Figure 8A:
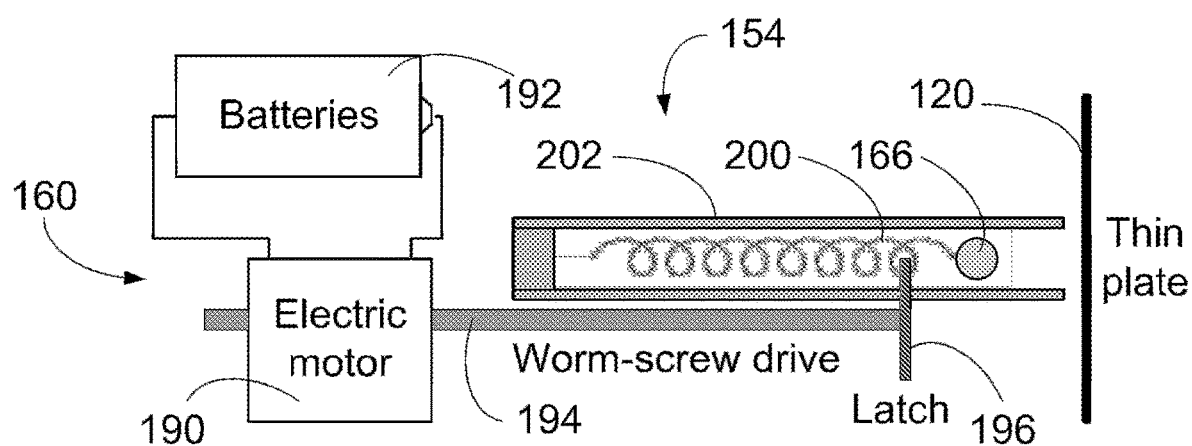
FIG. 8 consists of FIG. 8A and FIG. 8B, which are illustrations of a further implementation of the plate driver and a tunable mechanical transmitter respectively.

FIG. 8A is a diagram illustrating a further implementation of the plate driver 154. In this embodiment, the prime mover 160 comprises an electric motor 190 powered by a battery or batteries 192. The electric motor 190 drives a worm-screw drive 194. The worm-screw drive 194 is coupled to linearly displace a latch 196. A spring 200 is mounted in a barrel 202 anchored at an end which is remote from the transmitting plate 120. An opposite end of the spring 200 supports the impactor 166. The impactor 166 is preferentially spherical. Because a hard, durable, high-density impactor material with a high sound speed is preferred, steel is a preferred impactor material. The worm-screw drive 194 rotates to displace the latch 196 to compress the spring 200. At a preselected point and time, the latch 196 releases the spring 200, and the impactor 166 is propelled by the spring 200, causing the impactor 166 to impact the transmitting plate 120.

Figure 8B:
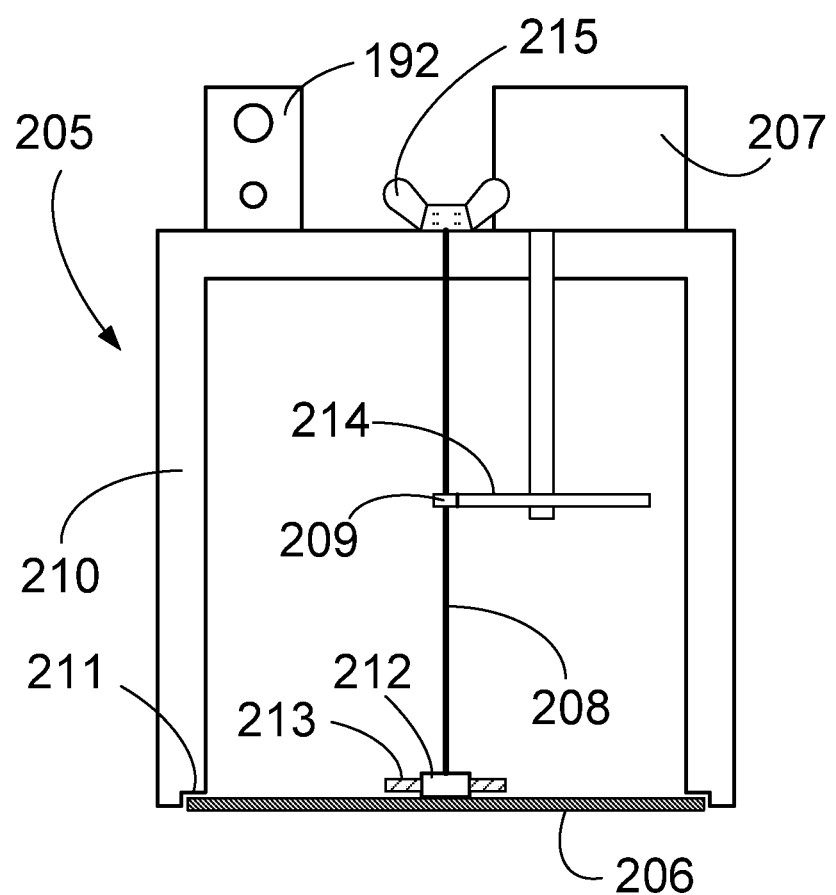

FIG. 8B is an illustration of a tunable mechanical transmitter 205. A thin plate (flat surface) 206 is caused to vibrate by plucking a wire 208 attached under tension provided by a tensioner 215 to the plate 206, rather than by high voltages. The wire 208 is plucked by a battery-operated mechanical means 207, such as a motor. In the embodiment of FIG. 8B, the transmitter 205 comprises the thin plate 206, the wire 208 under tension, a wire plucking means 209, and a supporting structure 210. The vibrating surface, the plate 206, in this particular illustration is a thin, circular aluminum plate, held tightly against a lip 211 on the bottom of the structure 210 by the tension of the wire. The tensioned wire 208 may be perpendicular to the plate 206 and may be attached to the center of the plate by a small block 212 cemented to the plate 206. The wire 208 may be held in the block 206 by opposing setscrews 213. When the wire 208 is plucked, it causes the plate 206 to oscillate longitudinally at twice the frequency of transverse wave oscillations on the wire 208, which may in general be much higher than the natural frequency of the plate 206. The thin plate 206 effectively acts as a spring, with the stiffness of the plate providing the restoring force.

The mechanical means of plucking the wire 208 is a rotating sawtooth wheel 214. Each tooth 209 of the wheel 214 is shark-fin shaped, with a convex gently curved edge and an acute straight edge. The wire 208 rides up on the curved edge and "falls" over the straight edge. In this way, the wire falling over the tooth 209 edge initiates discrete wavetrain pulses. The pulse repetition frequency is determined by the tooth spacing and by the rim speed of the wheel 214.

The mechanical transmitter 205 has a tunable frequency by adjusting the tension in the wire 208 by means of the tensioner 215. In one example the oscillating displacement of the plate 206 at the driving frequency of the wire 208 is only about 0.15 microns, or about 0.005 times the initial displacement of the wire 208 at the point where it was plucked. Since power is proportional to the square of the plate displacement, a nontunable, resonant configuration has orders of magnitude greater power.

This structure provides an efficient coupling of acoustic energy to solid walls. This structure allows for production and coupling of high-power acoustic pulses to all liquid and solid media. This structure is well-suited to use in a sonobuoy surveillance network. Advantages of the mechanical transducers herein include high acoustic pulse power output, low electrical power input, high efficiency, light weight, compact size, low cost, and low-voltage long-duration battery operation. These advantages are available in underwater systems and TWS systems.

Figure 9:
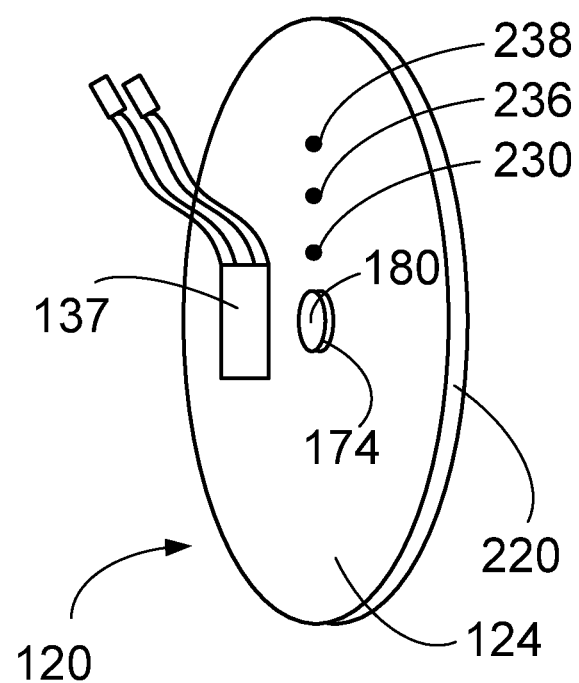
FIG. 9 is a view of a transmitting plate.

FIG. 9 is a view of one form of transmitting plate 120. The transmitting plate includes an outer axial surface 220. In one preferred form, the transmitting plate 120 is circular and is secured by the frame 168 (FIG. 6) around a circumference 222. In the present context, the circumference 222 includes a portion extending radially inwardly of the outer axial surface 220 that is held by the frame 168. The anvil 174 is placed on the rear surface 124.

In one embodiment, the transmitting plate 120 transmits acoustic radiation into water at a frequency of 1 kHz and at an average power of 50 W. Considerations for selection of transmitting parameters and transmitting plate 120 specifications are discussed below. An exemplary set of specifications for an impact transmitter point design of an edge-clamped circular aluminum plate that can radiate 50-W, 4-ms pulses into sea water at 1 kHz is set forth in Table I.

TABLE I

| Parameter | Value |
| --- | --- |
| Plate radius, cm | b = 14 |
| Plate thickness, cm | d = 1.3 |
| Initial specific energy, J/kg | $E_0 = 0.21$ |
| Plate frequency in air, kHz | $f_p = 1.6$ |
| Plate area, cm$^2$ | A = 650 |
| Active area, cm$^2$ | $A_a = 120$ |
| Active radius, cm | a = 6.1 |
| Plate mass, kg | M = 2.2 |
| Active mass, kg | $M_a = 0.41$ |
| Reactive mass, kg | $M_r = 0.63$ |
| Effective mass, kg | $M_e = 1.0$ |
| Mass ratio | $\mu^2 = 2.5$ |
| Initial effective energy, J | $M_e E_0 = 0.22$ |
| Angular frequency, kHz | $\omega = 6.3$ |
| Wavenumber, cm$^{-1}$ | k = 0.042 |
| Diffraction constant | ka = 0.26 |
| Spring constant, kg/(ms)$^2$ | K = 41 |
| Max. displacement, cm | $z_0 = 0.010$ |
| Max. velocity, cm/s | $u_0 = 65$ |
| Radiation resistance, kg/ms | $R_r = 0.60$ |
| Radiation reactance, kg/ms | $X_r = 3.9$ |
| Peak radiated power, W | $P_0 = 260$ |
| Average radiated power, W | $P_r = 50$ |
| Decay rate, kHz | $\Gamma = 0.58$ |
| Bandwidth, kHz | B = 0.091 |
| Quality factor | Q = 11 |

Alternatives to the central point of impact 180 of FIG. 6 are illustrated in FIG. 9. In FIG. 9, a selectable point of impact 230 is provided. The vibration mode which is produced correlates with the selectable point of impact 230 on which the transmitting plate 120 is struck. In one preferred form, the circular transmitting plate 120 is struck at a center 232 on the anvil 174, which excites primarily the fundamental mode of vibration of the transmitting plate 120. Setting the selectable point of impact 230 at other positions, such as 236 or 238, will excite different combinations of modes of vibration with different frequencies.

Figure 10:
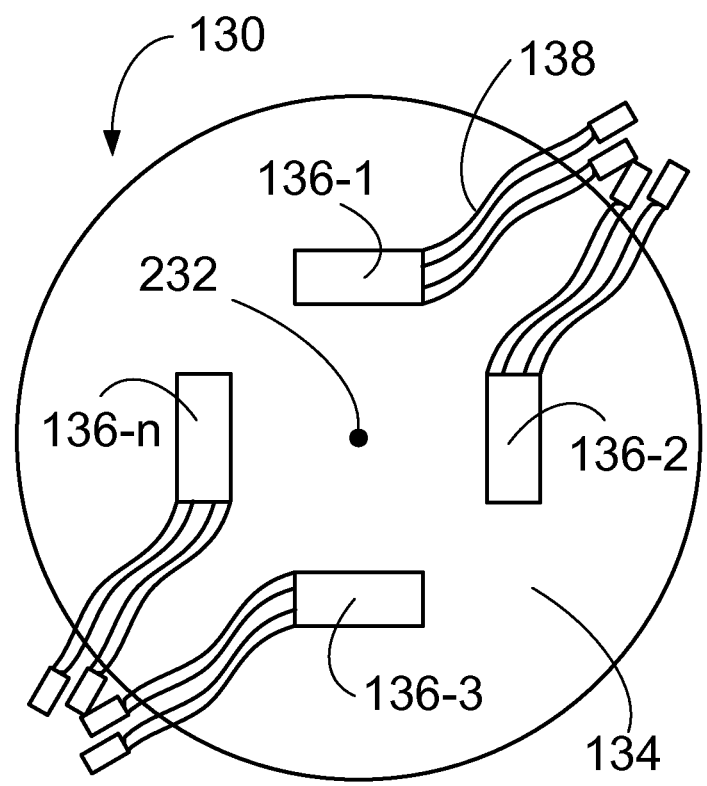
FIG. 10 illustrates a means for selecting positions of piezoelectric sensors on a plate.

In general, a multiplicity of the receiver sensors 136 are preferably attached to the rear surface 134 of the receiving plate 130, as shown in FIG. 10. The receiver sensors 136, which are piezoelectric film sensors in this embodiment, are attached with their polarities, corresponding to the vibrational mode that is being measured, in series. If n sensors attached in series each measure the same voltage response with the same polarity, the signal strength will be amplified by $n^2$, because signal strength scales as voltage squared. For example, the receiving plate 130 in FIG. 10 has four piezoelectric film receiver sensors 136 mounted on its rear side 134 in a symmetrical square array around the center 232 of the receiver plate 130. Flexible sensor leads 138 were soldered to each other in series at a 10-pin header enhancing the signal voltage received from fundamental-mode oscillations of the plate 130 by a factor of about 4 over a single sensor and the signal strength by a factor of about 16.

Figure 14:
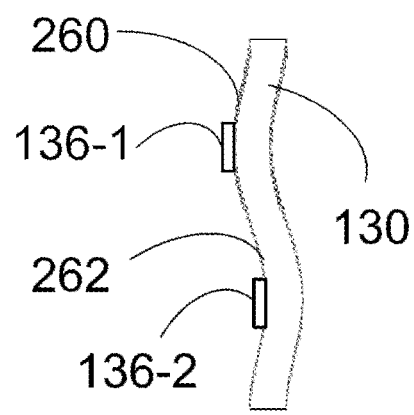
FIG. 14 illustrates sensors mounted for operation in a dipole mode.

As illustrated in FIG. 14, which is described below, for some vibrational modes, such as dipole modes, one piezoelectric film receiver sensor 136 may be stretched over a convex bend 260 while at the same moment another is compressed over a concave bend 262. In that case, their voltage polarities will be opposite each other, and their leads should be connected positive to positive or negative to negative in order for their voltage signals to add constructively when monitoring that particular mode of vibration.

If the receiving plate 130 is not the same plate as the transmitting plate 120 used for transmitting pulses, in a preferred example, it would be identical, and the mounting, bonding, and fastening of the receiving plate 130 would be identical to the mounting, bonding, and fastening of the transmitting plate 120. The plates 120 and 130 and mountings are sufficiently alike if the normal mode resonant frequencies of both plates will be within a tolerance providing a degree of accuracy such that the bandwidths of the useful resonances at the receiver substantially overlap the corresponding bandwidths at the transmitter. It may be preferable to use a strong bonding agent, in addition to mechanical fasteners such as bolts, to provide uniform edge-clamped boundary conditions in both plates. Uniformity in edge-clamped boundary conditions also enhances the quality factor Q of both plates.

Acoustic waves which strike each receiving plate 130 must be sensed. One preferred way to sense the acoustic waves is to affix the receiver sensors 136 to the receiving rear surface 134 of the receiving plate 130. The piezoelectric receiver sensor 136 responds to vibrations. Vibrations are sensed at areas of stress in the receiving resonant plate 130. FIG. 10 illustrates the concept of placing receiver sensors 136 at locations on the vibrating receiving plate 130 where stresses are greatest because curvature of the plate 130 is greatest for the particular vibrational mode that is being measured.

FIG. 10 is also a rear view of the receiving plate 130 having at least one receiver sensor 136 mounted on the rear receiving surface 134. One preferred form of receiver sensor 136 is a piezoelectric film. A multiplicity of receiver sensors 136, 136-1 through 136-n, where n is an integer, may be provided. Receiver sensors 136 may each be coupled to a pair of respective sensor leads 138. In an embodiment of FIG. 10, the piezoelectric receiver sensors 136 are mounted on a 10-cm diameter, 1-mm-thick aluminum plate at a location on the plate where it would be most responsive to the flexing of the fundamental mode. An effective way to optimize the positioning of the piezoelectric receiver sensors 136 is by repeatedly measuring the in-band response of a sensor to a calibrated signal as the sensor is repeatedly lifted and adhesively fastened onto new positions.

Figure 11:
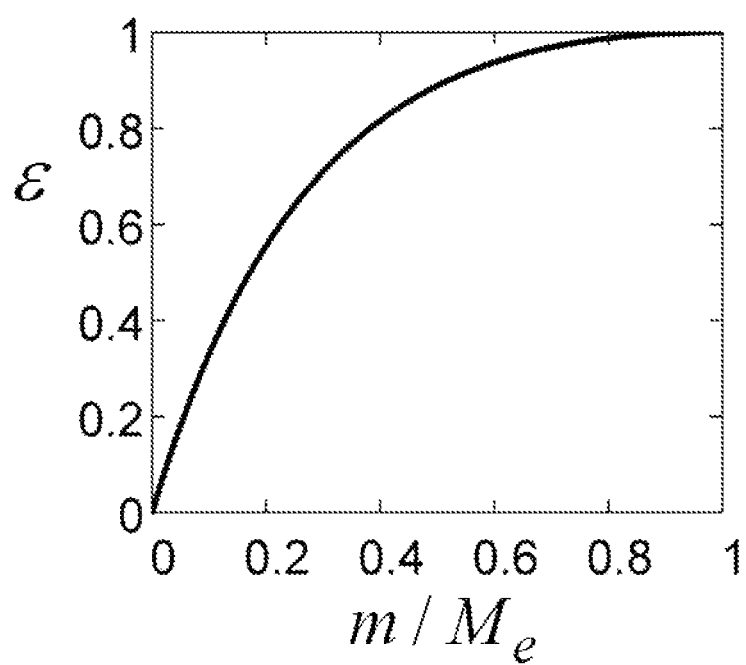
FIG. 11 is a graph illustrating efficiency of energy transfer for elastic impacts of impactor mass m on plate of effective mass $M_e$.

FIG. 11 is a graph illustrating efficiency of energy transfer for elastic impacts of impactor mass m on a plate of effective mass $M_e$. The effective mass $M_e$ is defined as the sum of the active mass $M_a$ of the transmitting plate and the effective reactive mass $M_r$ of the medium in front of the plate (see Table I). If impact duration, the contact time of the impactor 166 on the transmitting plate 120, is too long for efficient transfer of kinetic energy from the impactor 166 to the plate 120, then the impactor 166 must deliver the necessary energy to the plate 120 at higher velocity and lower mass and lower efficiency. The energy efficiency of elastic impacts on a plate falls with impactor mass as $\varepsilon = 4(m/M_e)/(1+m/M_e)^2$ form less than $M_e$, as shown in FIG. 11.

Figure 12:
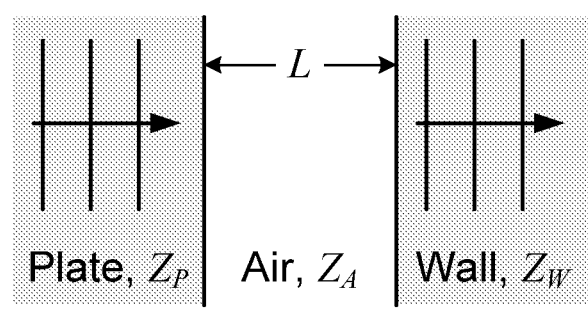
FIG. 12 is an illustration of model for transmission of sound from a transmitting plate into wall across air gap.

FIG. 12 is an illustration of a model for transmission of sound from a transmitting plate 120 into wall 72 across an air gap. The intensity transmission coefficient from plate to wall scales with air gap L as $T_I L^{-2}$. The difference between an air gap of 1 mm and 0.2 mm is 14 dB in transmission into the wall 72. The air gap L should not be made so thin, though, that the maximum amplitude $z_0$ of the plate vibrations causes the plate to contact the wall. That is, transmission into the wall is maximized for the narrowest gap subject to $L > z_0$.

Figure 13:
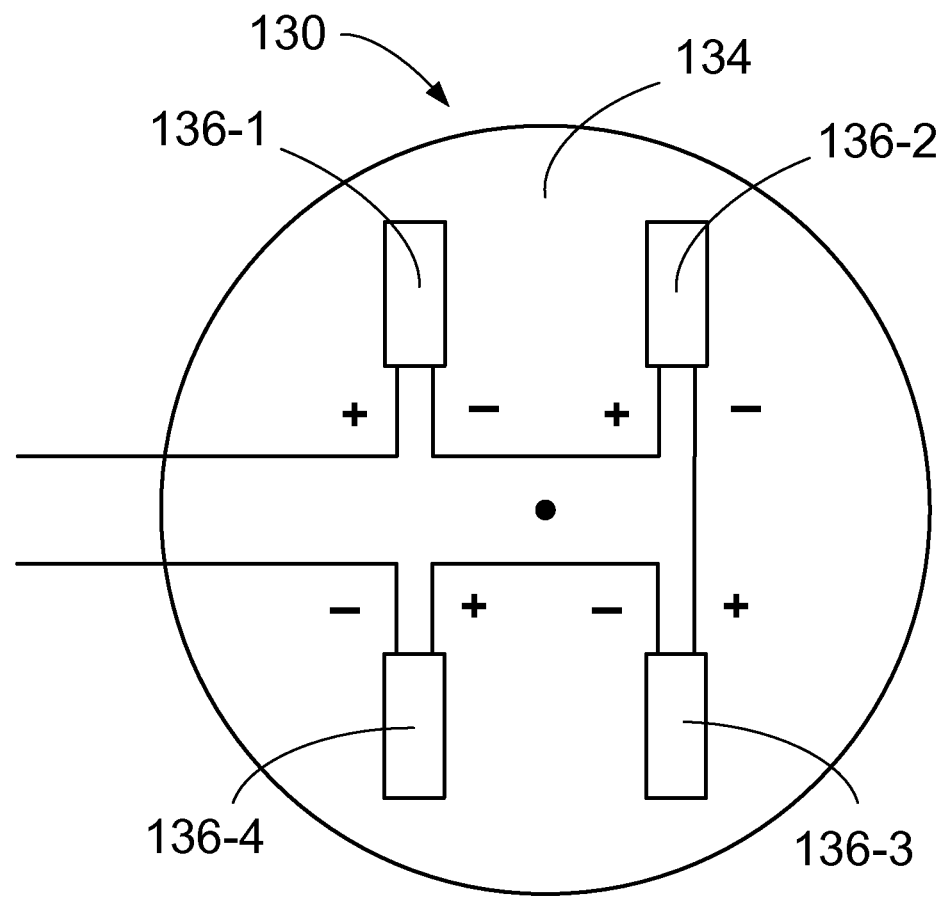
FIG. 13 is an illustration of sensors mounted in series on a receiving plate.

FIG. 13 is an illustration of a series of sensors mounted on the receiving plate 130. In general, a multiplicity of sensors can and should monitor vibrations on the receiving plate 130. The sensors should have their polarities, corresponding to the vibrational mode that is being measured, connected in series. If n sensors attached in series each measure the same voltage response with the same polarity, the signal strength will be amplified by $n^2$. For example, the receiving plate 130 in FIG. 13 has four piezoelectric receiver sensors 136-1 through 136-4 mounted on its receiving rear surface 134 in a symmetrical square array around the center 232 of the plate. This configuration enhances the signal voltage produced by the fundamental mode of vibration by a factor of 4 over a single sensor and the signal strength by about 12 dB, a factor of 16.

FIG. 14 illustrates sensors mounted on a partial, enlarged side view of the receiving plate 130 for operation in a dipole mode. The scale is greatly exaggerated in the horizontal direction relative to the vertical direction. One piezoelectric receiver sensor 136-1 may be stretched over the convex bend 260 while another receiver sensor 136-2 is compressed over the concave bend 262. In that case, their voltage polarities will be opposite each other, and their leads 138 should be connected positive to positive or negative to negative in order for their voltage signals to add constructively.

Figure 15:
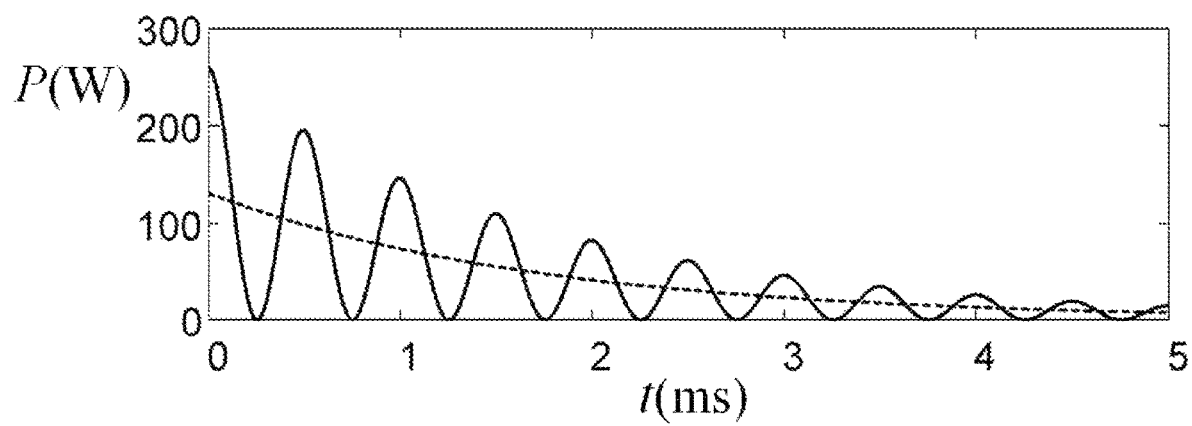
FIG. 15 is a waveform chart illustrating radiated power vs. time (solid curve) for point design of 1-kHz undersea impact transducer; averaged over wave cycle (dashed)

FIG. 15 is a chart that illustrates a typical exponentially decaying pattern of acoustic power radiated into a medium by an impact transmitter. Radiated power is shown in the solid curve for the point design of the 1-kHz undersea impact transducer given by Table I. The power averaged over a wave cycle is illustrated by the dashed line. In this example, the average power radiated during 4 ms is 50 W. In this example, the average electrical input power to produce a pulse every 5 seconds is 0.7 W.

A highly effective and efficient way to couple acoustic energy into the dense medium 10, such as a wall or water is provided. A properly designed thin plate transduces a mechanical impulse to acoustic energy in a dense medium with high efficiency at the resonant mode frequencies of the plate.

Acoustic energy is transmitted across an interface into a medium only by producing a mechanical motion of the medium within a wavelength of the interface. And an effective and efficient way to produce a mechanical motion of the medium is by inducing a purely mechanical motion of the interface, such as by a mechanical pusher or by a mechanical impulse. If the interface is moved by purely mechanical means, then the only significant energy losses, other than in producing the mechanical driving motion, are in the mechanical linkages or in the inelasticity or momentum-transfer mismatch of the impacts, which can be made small.

This power transmission uses the excitation of a thin plate as shown in FIG. 6. An actuator propels a mass, called the impactor 166, at the thin plate 120. The mass impacts the plate and bounces back, exciting the fundamental mode if striking the center of a symmetrical plate, and exciting higher frequency modes if striking off center. The thin plate 120 then rings down, delivering much of its kinetic energy to acoustic radiation in the medium 10, if coupled properly.

For coupling a transmitter 102 (FIG. 16) to water or other liquid media, in one preferred embodiment, the transmitting front surface 122 drives the medium 10 directly. For an impact transmitter in a liquid medium such as the body of water 12 (FIG. 1), after the impactor 166 has delivered a momentum impulse and kinetic energy to the transmitting plate 120, the primary avenue for that kinetic energy to be spent is by doing acoustic work on the medium 10.

The maximum kinetic energy of a circular edge-clamped plate of mass M is calculated as a function of the maximum plate velocity at the center $u_0$, and is found to be 0.182 $(Mu_0^2/2)$, which is equal to the maximum kinetic energy of a flat circular piston having the same velocity, $u_0$, but a mass of only 0.182M. Because only the central region of the edge-clamped plate moves much, the active plate mass $M_a$ is only 18.2% of the actual mass. That means the active area of the plate is $A_a$=0.182 A, and the active radius is a=0.427b, where b is the actual radius of the plate. Different boundary conditions would result in different active masses and areas.

When the impact transmitter is submerged in water or other dense fluid, the fluid increases the effective mass of the plate, decreases the resonant frequency, increases the maximum acoustic power output, and broadens the bandwidth, compared to the performance of the same transmitter in air.

When operated under water, the mode frequencies of a thin plate are downshifted. The effect of the water is to increase the effective mass of the plate. For a given spring constant, a greater mass oscillates at a lower frequency. If the spring constant of the plate is stiff, then the water can be inconsequential. For example, the oscillations of a heavy-duty spring from the strut on a car would be virtually unaffected by water. But if the spring constant of the plate is weak, then the water can significantly downshift the resonant mode frequencies.

Figure 16:
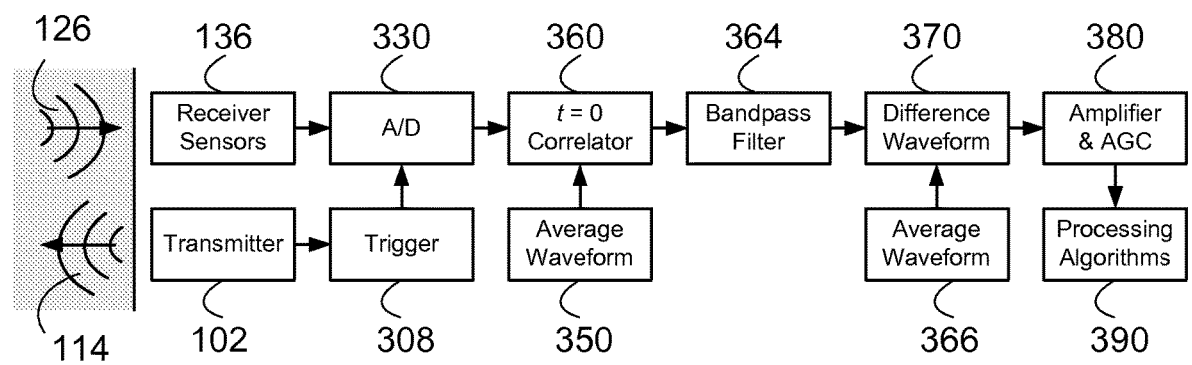
FIG. 16 is a block diagram of a module for processing received audio waves.

FIG. 16 is a block diagram of steps for processing acoustic reflections at receivers into detections of persons on the other side of a wall or into an x-y map giving their real-time locations. In one embodiment, the transmitter 102 produces periodic periodic acoustic pulses. Each strike of the impactor 166 on the transmitter plate 120 produces acoustic waves 114 in the medium 10. Each strike of the impactor 166 on the transmitter plate 120 also triggers the receiver 104, preferably by producing a sharp voltage spike in a piezoelectric film sensor 137 attached to the transmitting plate 120 to serve as a trigger.

In the receiver 104 receiver sensors 136 sense received acoustic waves 126. The receiver sensors 136 convert these waves into electrical signals. An analog-to-digital (A/D) converter 330 converts the signals to digital data for processing as described with respect to FIG. 17.

Steps in FIG. 16 are explained more fully below with respect to FIG. 17. An example of through-wall detection made by the impact transducer 1 is provided.

The signal processing for each transmitted pulse begins with the impactor 166 striking the transmitting plate 120. That event triggers the start of a delay period of some number of milliseconds. For example, to trigger the delay period, the impactor can produce a large voltage spike in a trigger unit 308 from the piezoelectric film sensor 137 affixed to the transmitting plate 120. The delay period is needed so that the sound pulse produced by the impact and conducted through the air and through the walls to the receivers will be sufficiently diminished at the receivers by the end of the delay period. The disadvantage of the delay period is that persons in the immediate vicinity of the transmitter will not be detected. The longer the delay period, the greater the 'dead zone' for detection.

After the delay period ends, the signal processor begins acquiring voltage waveforms from the receiver sensors 136. If it is only required to detect humans, and not to locate or track them, then only one receiver may be necessary. Otherwise, a horizontal linear array of at least two receivers is needed. The voltage waveforms from each receiver are then digitized by the A/D converter 330.

During the delay period an output such as a square wave 404 of zero amplitude may be used to inhibit processing of received signals. In the present illustration the A/D converter 330 provides digitized input data for processing. The trigger unit 308 is programmed to turn the A/D to an "off" state for the duration of the square wave 404.

The digitized waveforms carry information about the acoustic waves reflected from all objects and persons on the other side of a wall. Since the receivers may also receive reflections from the same side of the wall, it may be necessary to operate the system remotely, as illustrated by the embodiment in FIG. 2, if transmitter back lobes and side lobes cannot be suppressed. The next steps in signal processing are to remove reflections from completely motionless objects.

At all times, a running average is kept in a first memory 350 of the past n waveforms from each receiver. Since the noise level will be suppressed and S/N will be increased by a factor of about $n^{1/2}$, the number of waveforms in the average should be as large as allowed by operational constraints. The newest waveform can be set to start at exactly the same time delay with respect to the impactor 166 striking the plate 120 as the average waveform. Or at least the difference in time delays with the average waveform will be very much less than the wave period. If not, then it may be necessary to adjust the start of the newest waveform to correspond to the start of the average waveform. This can be done by cross-correlating the newest waveform with the average waveform in the first memory 350 using a correlator 360.

After t=0 has been established for the newest voltage waveform for each receiver at the correlator 360, a bandpass filter 364 is applied to the waveforms. The filter 364 should be matched to the resonant frequency or frequencies of the transmitter and receiver. The bandwidth or bandwidths of the filter 364 should be matched to be no less than about the full width at half maximum (FWHM) of the spectral resonances. Generally, as long as the bandwidth encompasses the FWHM, the narrower the bandpass of the filter 364, the more noise is excluded from the signal and the higher the signal-to-noise ratio, S/N. But the bandpass filter 364 should not be so narrow that it excludes a significant part of the in-band resonant energy, or that it reduces probability of detection.

After the waveforms have been filtered, the filtered waveform from each receiver is compared to, and subtracted from, a running average of the past n filtered waveforms from that receiver. The running average is provided from a second memory 366. The newest filtered waveform is destructively interfered with the most recent average filtered waveform in the second memory 366 at a difference-waveform generator 370.

The output of that waveform interference process, the difference waveform, should only differ significantly from noise for those reflections from targets that are not motionless. The difference waveform is amplified with an automatic gain control (AGC) 380. The AGC is designed to compensate for the weaker reflections arriving from more distant targets. The power of the diffusely reflected sound waves received from a target scales with range r as approximately $r^{-3.8}$. The time-of-flight of the reflected sound waves is measured, and the range is roughly half the time-of-flight times the sound speed in air.

The filtered and amplified difference waveforms from one receiver may be sufficient to detect persons through a wall. To locate and track persons requires at least two receivers. The difference waveforms may be operated on by detection or tracking algorithms 390. If the transmit and receive beam divergence is narrow relative to the area to be scanned, then a linear array of more than two receivers and/or transducers may be needed to cover fully the area to be scanned. In that case difference waveforms can be created from neighboring pairs of receivers, or with appropriate modifications to tracking algorithms, difference waveforms can be created from more than two waveforms, with some improvement in resolution, particularly cross-range resolution.

Figure 17:
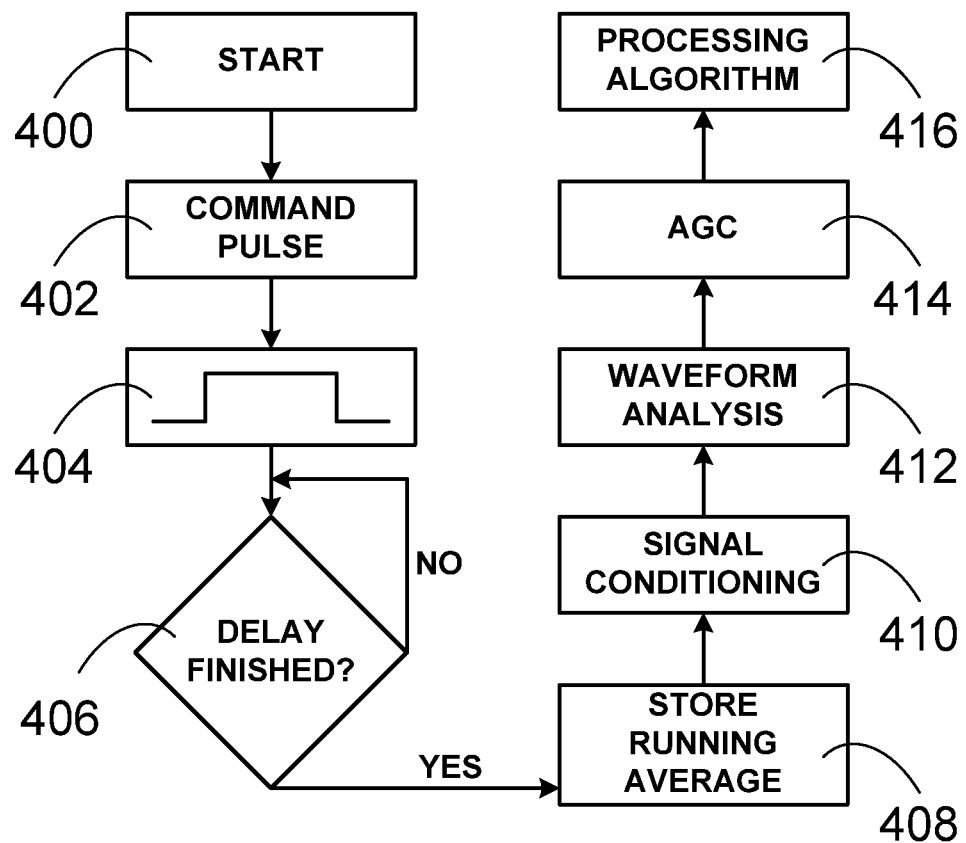
FIG. 17 is a functional block diagram of a computer program for processing the received audio waves.

FIG. 17 is a functional block diagram of a computer program for processing received audio waves 126 in a through-wall embodiment. FIG. 17 is also a summary of certain operations described with respect to FIG. 16. At block 400, a processing cycle for each transmitted pulse begins with a trigger signal being generated. At block 402, production of a delaying pulse is commanded. At block 404, a delaying pulse is generated. In one preferred embodiment, the delay is on the order of milliseconds. During the delay period received audio waves 126 are not processed. The delay period is needed so that the noise produced by the impact and conducted through the air and through the wall to the receivers will be sufficiently diminished at the receiver by the end of the delay period. At block 406 it is sensed whether the delay has finished. If so, operation proceeds to block 408. If the delay is not finished operation returns to the input of block 406.

At block 408 signal processing begins. A running average 408 is kept of waveform data in the first memory 350. The signal processor begins acquiring voltage waveforms from the sensors on the receivers. The voltage waveforms from each receiver are then digitized in the A/D converter 330. To detect humans, at least one receiver is needed. To locate or track them, an array of at least two receivers is needed.

The digitized waveforms carry information about the acoustic waves reflected from all objects and persons on the other side of the wall. Since the receivers may also receive reflections from the same side of the wall, it may be necessary to operate the system remotely if transmitter back lobes and side lobes cannot be suppressed. The next steps in signal processing are to remove reflections from completely motionless objects.

A preselected number n of waveforms from each receiving module memory is used to produce a running average. Since the noise level will be suppressed and S/N will be increased by a factor of about $n^{1/2}$, the number of waveforms in the average should be as large as allowed by operational constraints.

At block 410, signal conditioning is performed. For example, after time t=0 has been established for a new cycle, the bandpass filter 364 is applied to the waveforms. The filter 364 is matched to the resonant frequency or frequencies of the transmitter and receiver. The bandwidth of the filter should be matched to about the full width at half maximum of the spectral resonances. Generally, the narrower the bandpass filter, the more noise is excluded from the signal and the higher the S/N. But the bandpass filter should not be so narrow that it excludes a significant part of the in-band resonant energy, or that it reduces probability of detection.

At block 412 a "difference" routine is performed at which the filtered waveform from each receiver is compared to and subtracted from a running average stored in the second memory 366 of the past n filtered waveforms from each respective receiver. The newest filtered waveform is destructively interfered with the average filtered waveform.

The output of that waveform interference process, the difference waveform, should only differ substantially from noise for reflections from targets that are not motionless. At block 414 the difference waveform is amplified and automatic gain control (AGC) is preferably provided. With some changes to the tracking algorithms, difference waveforms can be created from more than two waveforms, with some improvement in resolution, particularly cross-range resolution.

At block 416, the calculated data is provided to the processing algorithms 390, which may be detection algorithms or tracking algorithms. Different algorithms may be selected for different purposes. The processed signal may be used, for example, for detection of humans within a cargo container or for continuous, real-time tracking of humans behind a wall.

Figure 18:
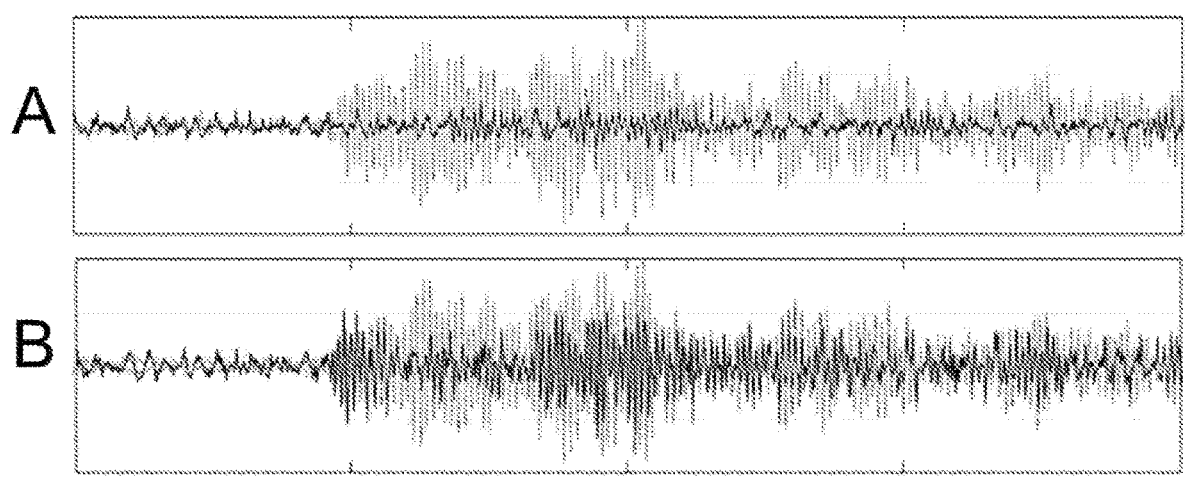
FIG. 18 is a waveform chart illustrating operation of an unfiltered receiver in a through-wall monitoring system.

FIG. 18, consisting of FIGS. 18A and 18B, is a waveform chart illustrating operation in a through-wall monitoring system embodiment of the transducer apparatus 1. In an example of signal processing for an acoustic through-wall detection system, acoustic pulses are produced and coupled into a wall 72 for about 15 to 30 seconds at a constant pulse repetition frequency (pro of about 3 per second. This rate allows reverberations in a 40-ft cargo container 70 to subside significantly between pulses. Next, the last n received echo signals are averaged to produce a baseline signal against which the latest signal is compared. The signal-to-noise ratio (S/N) of the averaged signal is improved by about $n^{1/2}$. For example, if the last 16 echo signals are averaged, S/N is improved by about 6 dB, or a factor of 4. The latest signal, after being filtered by the bandpass filter 364 at the resonant frequency, is subtracted from the average in the second memory 366 of the last n filtered signals. A difference waveform in excess of a preselected threshold indicates a movement of something on the other side of the wall 72. The sensor system located outside the wall 72 can be more sensitive to motion on the same side of the wall 72 than it is to motion on the opposite side of the wall 72 inside the container. For that reason, the receiver could be shielded from ambient noise and/or the system could be operated remotely with no humans nearby, as illustrated in the embodiment in FIG. 2.

The waveforms in FIG. 18 illustrate a comparison of three successive through-wall tests, with the acoustic pulses transmitted through a massive desk and a solid hardwood wall. The operator was seated at the position of the receiver, 6 meters away from the transmitter. The received waveforms were each averaged over 16 pulses. Voltage waveforms used include a first average baseline waveform created with the operator motionless. With the operator position unchanged, a second averaged waveform was created. This waveform is overlaid on the first voltage waveform in FIG. 18A. The second voltage waveform is illustrated in gray. Portions of the first waveform which are not covered by the second waveform are illustrated as dark extensions at vertical extremities of the second waveform. A third averaged waveform was created as the operator moved about, and was overlaid on the first average baseline waveform as the grey waveform in FIG. 18B. The bold waveform in FIG. 18A represents the difference between the first and second waveforms. The bold waveform in FIG. 18B represents the difference between the first and third waveforms. The large amplitude of the bold waveform in FIG. 18B, following a quiescent sound transit time through air, is indicative of the operator moving about.

Figure 19:
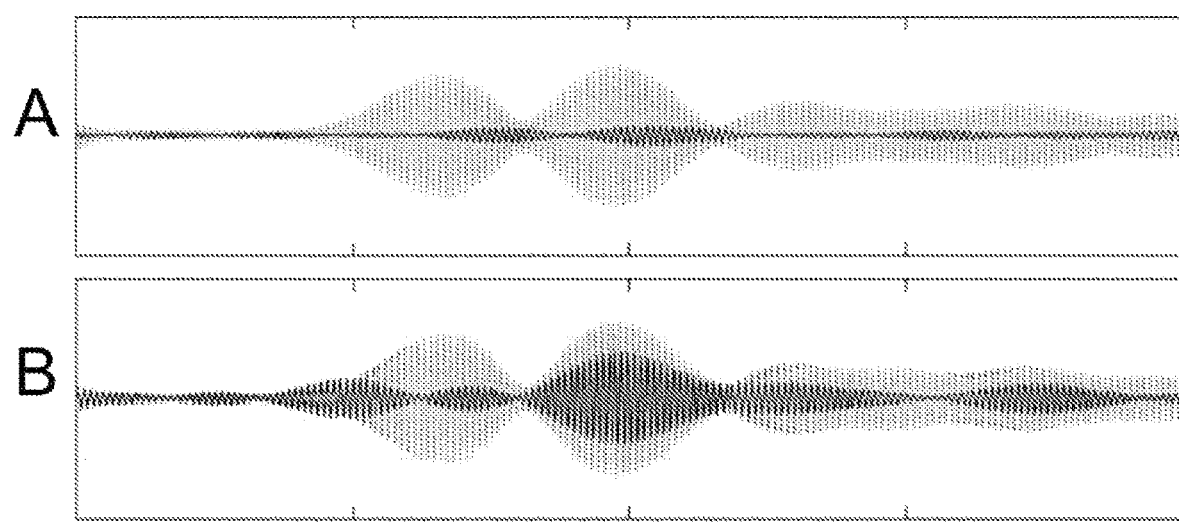
FIG. 19 is a waveform chart illustrating operation of a filtered receiver in a through-wall monitoring system.

FIG. 19, consisting of FIGS. 19A and 19B, illustrates the effects of applying a bandpass filter in processing through-wall waveforms. FIGS. 19A and 19B compare the same combinations of waveforms in FIGS. 18A and 18B, respectively, but with a software bandpass filter about the resonant frequency of the receiving plate. In FIGS. 19A and 19B, the bandpass filter was applied in post-processing to the frequency band from 2101 Hz to 2223 Hz, which spans a filter bandwidth that is 5.6% of the central frequency of 2162 Hz. As in FIGS. 18A and 18B, portions of the first waveform which are not covered by the second waveform in FIG. 19A or by the third waveform in FIG. 19B are illustrated as dark extensions at vertical extremities. The bold waveform in FIG. 19A represents the difference between the first and second filtered waveforms. The bold waveform in FIG. 19B represents the difference between the first and third filtered waveforms. The large amplitude of the bold waveforms in FIG. 19B, following a quiescent sound transit time through air, is indicative of the operator moving about.

A narrowband filter/amplifier is used to create the filtered bands described above to exclude noise outside the bandpass filter. If the bandpass filter on the receiver is properly matched to the frequency and bandwidth of the transmitted acoustic waves, much of the useful signal will pass through the filter, thereby increasing S/N. In this example, a properly designed filter/amplifier could eliminate on the order of about 19 dB to 26 dB of noise from the filtered signal, improving the S/N by like amounts over the embodiment that produced the waveforms in FIG. 18.

The sampling rate requirements of the processor depend upon the operating frequency of the transducer. In order to accommodate round-trip travel times of acoustic waves in cargo containers that may be as long as 40 ft, especially when the containers might be cluttered and the acoustic waves might take some time to reverberate and accumulate at the receiver, the record length is preferably at least about 80 ms and need not be more than about 160 ms. According to the Nyquist criterion, the lowest sampling rate that could possibly measure the resonance is about twice the operating frequency, but such a low rate would lead to aliasing errors. In selected preferred embodiments, a sampling rate of five to ten times the operating frequency is suitable.

One suitable preferred pulse repetition frequency (pro of a through-wall system is about 3 Hz. This rate is sufficiently high for rapid detection of motion through a wall, yet allows sufficient time for decay of reverberations from a previous pulse.

In one preferred embodiment, the t=0 mark on the waveform is established by the methods described above. The voltage waveform is centered about the mean voltage. The voltage waveform is stored in memory. A running average of the past n waveforms, where n is 10 to 16, is updated in memory. A new $(i+1)^{th}$ waveform is subtracted from the running average of the past n waveforms, up to and including the $i^{th}$ waveform, in order to produce a difference waveform. A difference waveform exceeding a selected threshold voltage over multiple contiguous samples indicates a detection.

Every time the new $(i+1)^{th}$ waveform is added to the average, the $(i+1-n)^{th}$ waveform is removed from the running average of the past n waveforms to update the running average. At a prf of 3 Hz, the first real-time detection can be made within about 4 to 5 seconds.

Figure 20:
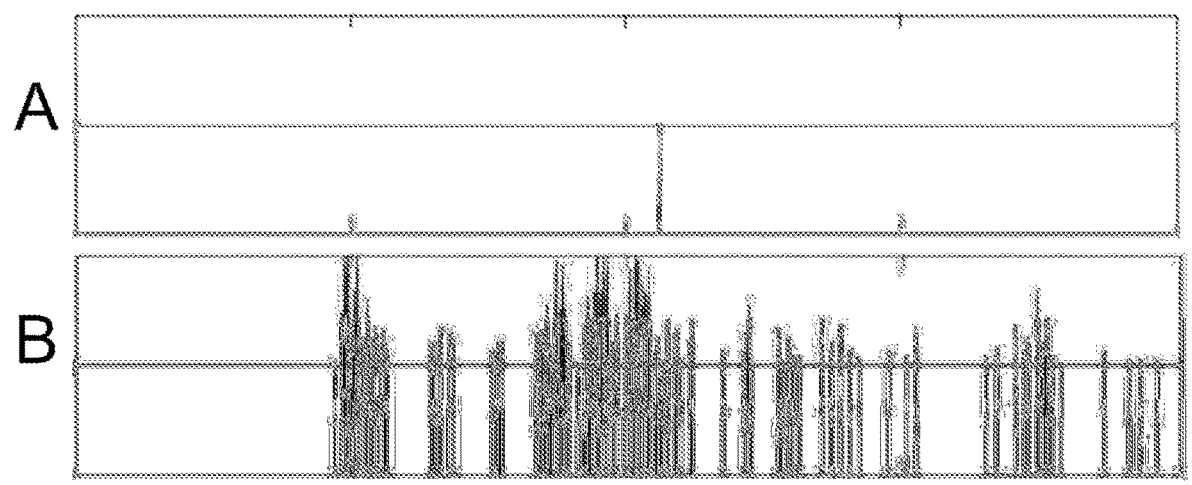
FIG. 20 is a waveform chart illustrating a detection display of presence or absence of a person on an opposite side of a wall.

FIG. 20, consisting of FIGS. 20A and 20B, illustrates a method of real-time detection by exceedances of a threshold voltage. The data from the baseline, second, and third waveforms, shown in FIG. 18 were used with a thresholding algorithm that provides an output indicative of voltage exceedances above 0.5 V. Since the noise amplitude is almost entirely below 0.5 V, voltage differences above this threshold caused by human motion are readily apparent in FIG. 20B.

With the thresholding algorithm illustrated in FIG. 20, detection of a moving person is accomplished without a narrow bandpass filter or fast Fourier transforms (FFTs) or inverse FFTs. The detection is achieved by performing a subtraction of waveforms and amplification of the difference waveform without even an AGC. Consequently, robust performance is provided with simplified processing.

Figure 21:
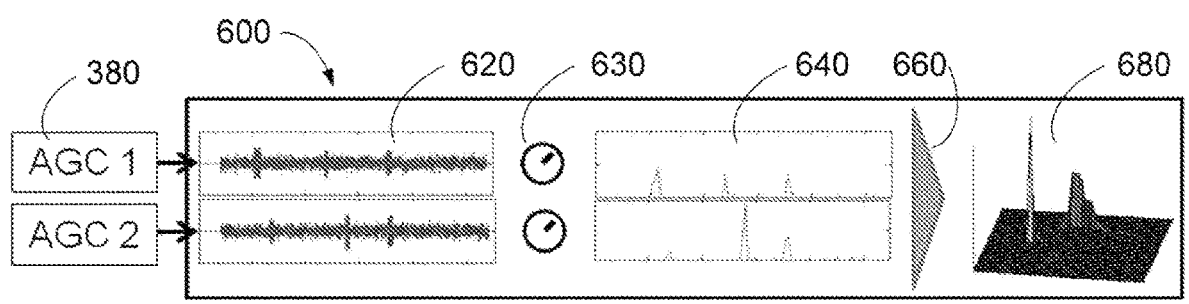
FIG. 21 is a functional block diagram of a computer program for processing the received audio waves for locating and tracking persons on an opposite side of a wall; and, FIG. 22 is an illustration of one embodiment of a variable-depth FASN unit.

With a tracking and locating 3-step algorithm 600, illustrated in FIG. 21, a TWS x-y display 680 may be produced that shows the locations and that tracks in near-real-time all persons on the other side of a wall 72. When implemented properly, the algorithm 600 transforms binaural voltage waveforms from two receivers to the map of current locations of persons 680. The algorithm 600 is fast because it emulates the way the human mind and eye perceive complex waveforms of thousands of data points. Just as the eye quickly picks out periods of threshold exceedances in voltage waveforms, the algorithm 600 does the same.

The three steps of the tracking and locating algorithm 600 are: (i) Filter noise; (ii) count data points in time bins; and (iii) triangulate. After voltage waveforms from each of two independent receivers have each been processed through the AGC 380 according to the method illustrated in FIG. 16, each waveform is subjected to the algorithm 600 process In one illustrative example, the waveforms from the AGC 380 represent typical return signals with a 50-ms record length beginning 4 ms after receiver triggering and a 100-kHz sampling rate. There are 5000 data points in each channel. With this record length and a 4-ms gate, the range of each receiver is 2.3 ft to 30.5 ft. With this range, stereo receivers separated by 5 ft at the center of one wall are capable of triangulating range to a target anywhere in a 25-ft×25-ft room (except for the immediate proximity of the receivers).

The first step of the algorithm is to filter out noise by means of a voltage threshold filter 620 applied to each of the two voltage waveforms from the two data channels. Any data point with a value less than an adjustable voltage threshold $V_0$ is set equal to zero. On a device in use, the adjustable threshold $V_0$ should be tunable with a brightness dial 630. The second step of the algorithm is to count how many data points remain in each time bin after filtering to produce a histogram 640 of exceedances of the threshold voltage $V_0$. The record length is divided into a number of equal time bins for this purpose. If a resolution of 0.5 ft×0.5 ft is desired in the x-y display 680, then we have found that time bins of 0.5 ms provide adequate resolution, but time bins of 1 ms do not. If the time bins are too big, then the x-y display 680 may overlook people and show ghost images.

The data in the threshold-exceedance histogram 640 were filtered with a brightness threshold of $V_0=3.2$. Then the data points remaining after filtering in each of 100 0.5-ms bins were counted to produce the histogram 640.

The third step of the algorithm 600 is triangulation 660, which involves transforming from range coordinates to x-y coordinates and correlating the filtered data in each x-y cell. The triangulation 660 is the most processing-intensive step, but it involves working with time bins, rather than voltage samples, and there are 10,000 times fewer time bins than voltage samples in this example.

To implement triangulation 660, an x-y grid is established, with p labeling the cells in the x direction, and q labeling the cells in the y direction. The value assigned to each cell (p,q) is the product of the count from the 'appropriate' time bin of one receiver with the count from the 'appropriate' time bin of the other receiver.

Suppose $P0_m$ is the count of data points from the histogram 640 in the $m^{th}$ time bin of one receiver, and $P1_n$ is the count in the $n^{th}$ time bin of the other receiver. Suppose that the time bins are 0.5 ms, the x-y cells are 0.5 ft×0.5 ft, the left receiver is 10 ft (20 cells) from the left corner of the room (where p=0), and the right receiver is 15 ft (30 cells) from the left corner of the room. Then the correlated-count value assigned to each cell (p,q) is $$C_{p,q}=(P0_m)(P1_n),$$

where the 'appropriate' time bins are $$m=\text{round}\{K[(p-20)^2+q^2]^{1/2}\},$$

$$n=\text{round}\{0.5K([(p-20)^2+q^2]^{1/2}+[(p-20-2d)^2+q^2]^{1/2})\}.$$

Here, "round" is a function that rounds off numbers to the nearest integer, and $K\equiv 2/c=1.77$ is a constant that accounts for the double round-trip time at the speed of sound in air, $c=1.13$ ft/ms.

After triangulation 660 was performed on the data from the histogram 640, the correlated-count value, $C_{p,q}$, may be displayed as the x-y map 680 of persons being tracked through the wall 72. The map 680 may be displayed as a 3-dimensional surface plot, as in FIG. 21.

The 3-step algorithm 600 is fast, because it emulates human perception in picking out only clusters of data points that stand out above the noise. Then, instead of correlating all of the data points in each channel (25 million correlations in this example), the algorithm 600 performs only one correlation per x-y grid cell (25 hundred correlations in this example).

The accuracy of the algorithm 600 in locating persons is limited by the pulse detection error, which is of the order of the return pulse width. The algorithm 600 reduces the numerical resolution to this low level of accuracy (a 0.5-ms time bin in this example) before correlating the two channels. Thus, the algorithm 600 does not need to degrade the realizable locating accuracy. In this example, the tracking resolution is better than 1 ft at ranges comparable to the receiver separation (5 ft in this example), and the cross-range resolution is degraded at ranges much longer than this separation.

The algorithm is robust at detecting signals, even at low S/N, and at eliminating false alarms (ghost images), as long as the time bins are chosen small enough (0.5 ms in this example). In this example, two of the targets had S/N≈4, yet were easily detected and located by the algorithm 600. The algorithm 600 is even robust at discriminating closely spaced persons.

The algorithm will be easy to use in a TWS device. The only parameter to be varied by the user is brightness (filter threshold $V_0$), which may be controlled by the brightness dial 630, with immediate visual feedback to the user.

Figure 22:
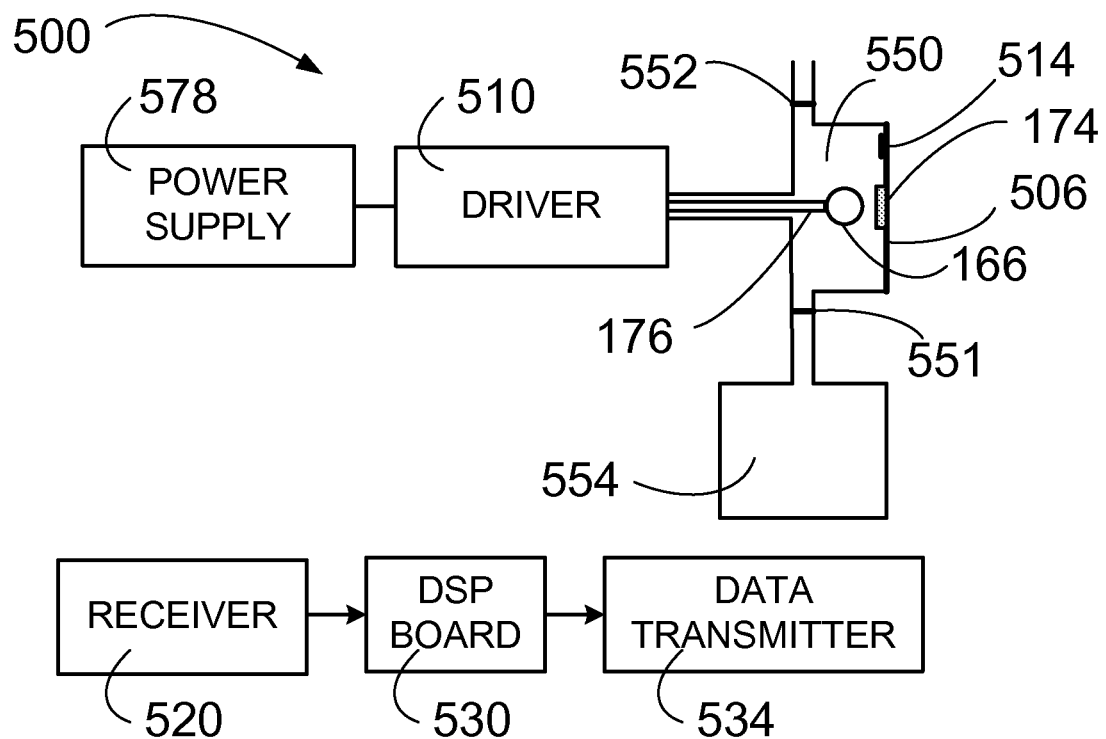

FIG. 22 is an illustration of one embodiment of an FASN unit 500 that is designed to operate at variable depths and water pressures. The FASN unit 500 may be anchored in place by a low-cost weight 36, like a concrete block, and by the tether 18. The sonar head 28 will be suspended at either a fixed or a variable depth below the floating buoy 24, as in FIG. 1. A fixed depth for all FASN units in a network ensures that the water pressure on the thin plate of each impact transducer is roughly constant and the same throughout the FASN network. Then the air or gas pressure behind the plate can be set during manufacture to equalize the water pressure, if necessary.

A cable from the sonar head 28 to the buoy 24 could transmit telemetry data to the antenna 26, which could be mounted on the buoy 24. The same cable could transmit control signals from the antenna 26 to the sonar head 28. The tension reel 32 could remove slack from the tether 18 in changing tides and waves, and could provide a restoring force to keep the buoy 24 positioned nearly vertically above the anchor 36 at all times.

In the embodiment of a variable-depth sonar head 500 in FIG. 22, there is a pressurized cavity 550 behind each resonant plate 506. The gas pressure in the cavity 550 can be equilibrated to the external water pressure by means of a pressure gauge and a regulator at a valve 551 to a compressed-gas tank 554. An excess of gas pressure in the cavity 550 can be relieved through the outlet valve 552.

A long-lifetime, autonomous sonobuoy 20 offers low-cost, efficient, compact, and lightweight approaches to the following basic features: i) energy storage/DC power supply; ii) impact transducer; and iii) a watertight housing in a body with flotation.

The sonar head 500 could in general comprise:
i) A watertight pressurized cavity 550
ii) One or more thin transmitting/receiving plates 506
iii) One or more drivers 510 for the plate or plates 506
iv) At least one piezoelectric film sensor 514 for each plate 506
v) A self-contained battery power supply 578
vi) A receiver 520
vii) A DSP board and other signal processing and data storage components 530
viii) A data transmitter 534 for transmitting data from the sonar head 500

The operating frequency of the impact transducer is chosen mainly as a trade-off between power production and ambient noise. The two principal types of ambient noise at inland rivers and waterways, ports and harbors, and near coastal regions are shipping noise and wind noise. Noise is much higher at low frequencies than high frequencies. In high-noise locations and shallow waters, like the Straits of Malacca, the level of ambient noise from shipping could be higher by 30 dB or more at 1 kHz than at 20 kHz. Nevertheless, it is easier to produce acoustic power at lower frequencies because the transducer is bigger and heavier. In the present illustration, 1 kHz is chosen as the nominal operating frequency.

For the present point design embodiment, corresponding to Table I, a battery energy/pulse of 3.3 J was needed for an impact transducer to radiate a 1-kHz, 4-ping-ms pulse at an average power of 50 W. A single high-capacity lithium thionyl chloride battery, such as the Saft LS 33600 3.6-V "D-cell" size battery, has a 17-A·hr capacity. This capacity corresponds to 220 kJ of stored energy per battery, enough to produce 67,000 pulses, for a 270 ping-second lifetime at 50 W average power. At a prf of one pulse per 5 minutes, one battery could drive the impact transmitter of the point design for nearly 8 months, and 8 such "D-cell" size batteries, for 5 years.

An alternative power supply for the point-design sonobuoy 20 comprises one or two rechargeable batteries and a self-recharging generator. As the tension reel 32 attached to the tether 18 (FIG. 1) unwinds and rewinds with wave motion, the spinning reel drives an electrical generator, which recharges the batteries. Through a ratchet-like cable drive, the wave motion acting on the buoy 24 can be made to do work on the generator, and to produce and store electrical energy in the rechargeable batteries, whether the tension reel is unwinding or rewinding. The tether cable 18 should be made of a strong, lightweight material that does not stretch significantly under tension and that has a specific gravity less than or about equal to that of sea water, 1.03. That will keep the requirements for tension in the reel and buoyancy in the buoy modest, even in deep littoral waters. Unlike intermittent and unreliable solar power, wave power is virtually continuous. The minimal average-power requirements of each point-design sonobuoy 20, including transmit/receive functions, 2-way communications, and station-keeping, can easily be provided by a self-recharging generator such as this one, based on wave motion.

The sonar projector can be designed to produce two or more counter-directed pulses, one each from plates at two opposite faces of the sonar head. As long as the wavelength is much greater than the plate diameter, each plate acts essentially as a simple source that produces nearly isotropic acoustic radiation.

A dual-plate impact-transmitter design, like that in FIG. 6, has a further advantage of allowing identically manufactured sonobuoy units to produce unique pulse signatures, even though they operate at identical frequencies, bandwidths, and pulse widths. Each plate of an impact transmitter has a sharply defined pulse start time t=0. Piezoelectric film sensors 137 affixed to each transmitting plate 120 register a sharply defined voltage spike at the moment of impact of the impactor on the plate. The jitter Δt in determining t=0 is much smaller than a wave period, and is generally about equal to the voltage sampling time. The high precision to which t=0 is known is used to assign a unique pulse signature to each dual-plate sonar head 500 after it has been manufactured, as explained with respect to FIG. 6.

Upon producing a double pulse, a FASN will transmit to either a relay buoy or to a central station a signal conveying its location and the time difference between the start of its two pulses. Any receiver in the sonobuoy network that receives this double pulse and then a short time later receives the reflected double pulse from a target, such as a submarine, will transmit a signal conveying its own location and the times of receiving the pairs of double pulses. From this information, the range of the target to the receiver is known. If at least two FASNs in the network report a detection, then the position of the target can be determined by triangulation.

This method of identifying the source depends upon pulses from at least one FASN reflecting from a target and being received by at least one other FASN in the network. That means the impact transmitters are preferably simple sources with nearly isotropic radiation patterns from each plate.

In a FASN network, the primary means of ensuring thorough surveillance coverage of a protected area is by proliferating nodes to achieve the desired margin of safety.

The active-sonar equation for the monostatic case, in which the transmitter and receiver are collocated, is given by:

$$TL = \frac{1}{2}(SL+TS+DI-NL-DT),$$

where TL is one-way transmission loss, SL is transmitter source level, TS is target strength, DI is receiving directivity index, NL is level of ambient noise and self-noise, and DT is the detection threshold of the receiver. Transmitting directivity index, or gain, is included in SL. Since the sonar equation is used here to estimate the maximum range for detection by a FASN in noisy environments, the range may be safely assumed to be long enough to be noise-limited rather than reverberation limited. Then the background level NL is isotropic noise, rather than reverberation.

Using this active-sonar equation for the monostatic case gives a conservative estimate of the range, because in a network of FASNs, the echo from the target may be received by a FASN that is closer than the transmitter, in which case the total transmission loss will be less than the 2TL used above.

One illustrative embodiment, based on the point design in Table I, has the following characteristics: Average pulse power $\bar{P}$ is 50 W; pulse duration T is 4 ms; transmitting (and receiving) directivity index or gain G is 0 dB; probability of false alarm $P_{FA}$ is 1%; probability of detection $P_D$ is 50%; and frequency is 1 kHz. The false alarm and detection requirements for each individual FASN are modest, because the probability of detection by a network of hundreds of FASNs will be much closer to 100%, and the network probability of false alarm will be much lower than 1%.

The echo pulse will be much longer than the 4-ms transmitter pulse, reducing the effective source level of the transmitter. The typical echo duration produced by a submarine target with multipath propagation in shallow water is 100 ms. The effective source level is therefore reduced by about 10 log (4 ms)/(100 ms)=−14 dB. But because this example is for a double-pulse, dual-plate sonar, with effectively twice the power or twice the pulse duration, the effective source level is increased by ±3 dB. This estimate is conservative, since surveillance by a network of fixed sonobuoys will generally allow targets approaching coastal waters to be viewed from a wide range of aspect angles. Accounting for pulse stretching, reverberations in shallow water, and moderate sea states, the sonar range to a submarine at intermediate aspect in average harbor noise of each FASN unit in this example is about 0.25 nautical miles.

The total mass of the embodiment of a dual-plate, 1-kHz sonar head in this example is less than or about 10 kg. Most of that mass (>5.4 kg) is in the two aluminum plates and the steel impactor. The entire sonar head can be packaged in a volume of about 1 cu. ft.

A 10-kHz sonar head, on the other hand, could be built much smaller and lighter, primarily because the impact-transducer plates are much smaller and the impactor is much lighter at 10 kHz. The trade-off, however, is that the impact transmitter produces less power at 10 kHz. In average harbor noise, however, the range estimate for a 1-kHz sonar at 50-W average power is comparable to that of a 10-kHz sonar at 1-W average power, even with greater absorption at 10 kHz. The reason is primarily that average harbor noise is about 17 dB quieter at 10 kHz than at 1 kHz. In littoral areas where ambient noise is not as significant, a 50-W 1-kHz transmitter would have much greater range than a 1-W 10-kHz transmitter.

Not only is a 10-kHz impact-transducer sonar head much lighter and more compact, it is also less costly than a 1-kHz sonar head which might cost less than or about $1000 in a nominal embodiment. The power requirements of the 10-kHz system are lower and, to the extent its range may be more limited, shortcomings in range can be compensated by greater proliferation of FASNs in the network. As a general rule for mechanical transducers used in sonar, however, noisy marine environments favor higher frequencies and quiet environments favor lower frequencies.

In the foregoing detailed description the present subject matter has been described with reference to specific exemplary embodiments thereof. It will, however, be evident that various modifications and changes may be made thereto without departing from the broader spirit and scope of the present subject matter. The present specification and figures are accordingly to be regarded as illustrative rather than restrictive. The specification is not intended to be exhaustive or to limit the present subject matter to the precise forms disclosed.

What is claimed is:

1. A mechanical transducer comprising a mechanical transmitter for transducing a mechanical impulse to acoustic energy in dense media comprising: an actuator or linear induction motor, a thin plate for transducing a mechanical impulse to acoustic energy, an impactor comprising a mass, said actuator or linear induction motor causing said impactor to strike said plate repetitively and induce oscillations in said plate, said transducer comprising an interface coupling oscillations from said plate to a liquid or solid medium, said actuator or linear induction motor comprising a source storing energy and a trigger to release stored energy as mechanical energy to cause said impactor to strike said plate.

2. A mechanical transducer according to claim 1 wherein said plate is constructed to vibrate in one or more resonant modes corresponding to a selected position of impact on the plate and wherein said impactor is mounted to impact the plate at the selected position.

3. A mechanical transducer according to claim 2 wherein said plate has shape, dimensions, material, and mounting such as to produce desired combinations of levels of acoustic radiation at desired frequencies.

4. A mechanical transducer according to claim 1 wherein said source storing energy comprises a spring and further comprising a driving mechanism for compressing the spring, said driving mechanism comprising means for compressing the spring over a preselected time period, the time period being selected to correspond to a level of power needed to compress the spring.

5. A mechanical transducer according to claim 1 wherein said trigger causing the release of stored energy from said source comprises a latch.

6. A mechanical transducer according to claim 4 wherein said plate is spaced with respect to the said impactor such that said plate is beyond an equilibrium position of said impactor, so that said impactor strikes said plate before decelerating significantly against the spring's pull, and does not remain in contact with said plate for an appreciable time after striking it.

7. A mechanical transducer according to claim 1 wherein said plate is provided with coupling means to couple acoustic waves efficiently to a liquid or solid medium.

8. A mechanical transducer according to claim 1 wherein the acoustic coupler comprises spacers between said plate and a high density solid medium, said spacers being proportioned to displace said plate with respect to a solid medium to use said solid medium as a sound board, and said spacers not interfering with the oscillations of said plate.

9. A mechanical transducer according to claim 1 wherein said actuator is operated at a preselected repetition rate in which the dormancy between pulses on each transmitter in a network is selectable.

10. A mechanical transducer according to claim 1 comprising a combination of transmitting plates wherein said impactor or a combination of impactors is mounted to impact said combination of plates in a preselected sequence and at preselected intervals.

11. A mechanical transducer according to claim 10 wherein differences in times between striking plates in said combination of plates defines a signature.

12. A mechanical transducer according to claim 11 wherein plates in said combination of plates have selectable relative positions to define a selected signature.

13. A mechanical transducer according to claim 12 wherein at least one plate in said combination of plates is slidably mounted with respect to said impactor into a selected position at which the location of impact by the impactor corresponds to a desired resonant mode.

14. A mechanical acoustic transducer according to claim 1 wherein the transmitting plate is supported to the body of the transmitter by a rigid frame and acoustic isolators.

15. A mechanical acoustic transducer according to claim 1 further comprising a sensor for producing an electrical signal indicative of striking of a plate by the impactor.

16. A mechanical acoustic transducer according to claim 1 further comprising at least one resonant receiver having a receiver plate matched to a transmitter plate.

17. A mechanical acoustic transducer according to claim 1 wherein the mechanical acoustic transducer comprises a tunable transmitter, the tunable transmitter comprising: a plate caused to vibrate, the plate having an area-to-thickness ratio to permit efficient transmission of acoustic radiation into a dense medium at the desired frequency, a wire under tension, a supporting structure supporting a perimeter of the plate, the wire under tension being secured to the plate and holding the plate in contact with the supporting structure, a mechanical means of plucking the wire to excite oscillations of the plate.

18. A mechanical acoustic transducer according to claim 17 wherein the plate is a thin, circular aluminum plate, the tensioned wire is substantially perpendicular to the plate, the tensioned wire being attached to the center of the plate, and mechanical means for plucking the tensioned wire, the means for plucking causing the plate to oscillate longitudinally at twice the frequency of transverse wave oscillations on the wire.

19. A mechanical acoustic transducer according to claim 18 wherein the mechanical means of plucking the wire is a rotating sawtooth wheel.

20. A mechanical acoustic transducer according to claim 1 wherein the mechanical acoustic transducer comprises a sonobuoy comprising a sonar head, the sonar head comprising: energy storage, at least one mechanical transducer, watertight body with flotation, watertight pressurized cavity, at least one thin plate, at least one actuator or linear induction motor and impactor for each plate or combination of plates, at least one sensor for each plate, a self-contained battery power supply, a signal processor including memory, and a cable or wireless means of transmitting data outside the sonar head.

21. A mechanical acoustic transducer according to claim 20 wherein the sonar head is connectable to a buoy for flotation and connectable to an anchor for fixing position by tethers, said tethers to include a tension reel to maintain said sonar head at a fixed depth below said buoy or at a fixed height above said anchor, and wherein internal gas pressure on said thin plate of each mechanical transducer is equilibrated to water pressure outside said sonar head, and wherein batteries, processing, and telemetry subsystems are protected within said sonar head, said sonar head being connectable to a communications antenna.

22. A mechanical acoustic transducer according to claim 21 wherein the tension reel is connectable to a buoy above and an anchor below by a tether or tethers, said tension reel to respond to wave motion and water currents acting on said buoy by continuously rotating in one direction to play out, and in the other direction to retract, said tether or tethers, the rotation in either or both directions driving an electrical generator, which charges or recharges electrical energy-storage devices, such as batteries.

23. A mechanical acoustic transducer according to claim 1 comprising a through-wall detection system.

24. A mechanical acoustic transducer according to claim 1 wherein the mechanical acoustic transducer further comprises a method for processing signals received by the acoustic transducer comprising producing a filtered waveform in response to a received acoustic signal; storing the waveform in a memory; calculating a running average of a preselected number of waveforms most recently received; storing a current updated value of the running average; subtracting a new currently received waveform from the current running average; producing a difference waveform; comparing the difference waveform to a threshold voltage and generating an exceedance for every voltage sample of the difference waveform in excess of the threshold voltage, and comparing the incidence of exceedances with a preselected threshold level of incidences indicative of a detection of moving persons or objects.

25. A mechanical acoustic transducer according to claim 24 wherein the method for processing signals received by the mechanical acoustic transducer further comprises the steps of: prior to producing the filtered waveform, sensing occurrence of a transmitter pulse, producing a trigger signal in response to the transmitter pulse, the trigger signal having a preselected duration, and inhibiting inputs of the received acoustic signal during the preselected duration.

26. A mechanical acoustic transducer according to claim 24 wherein the method for processing signals received by the mechanical acoustic transducer further comprises the steps of: triggering a receiver signal indicative of the received acoustic signal after a fixed delay; digitizing voltage waveforms; correlating $t=0$ of a current waveform to an average $t=0$ for a most recent n waveforms; and applying automatic gain control (AGC) to the receiver signal as a function of time.

27. A mechanical acoustic transducer according to claim 24 wherein the method for processing signals received by the mechanical acoustic transducer further comprises the steps of: after producing the difference waveforms from two or more receivers, applying an adjustable threshold filter of voltage exceedances for each waveform to produce histograms of said voltage exceedances versus range or time of flight for each waveform, and correlating said histograms of said voltage exceedances to triangulate the data from each receiver channel to produce a display of locations of persons and moving objects on the other side of a wall.

28. A mechanical acoustic transducer according to claim 1, comprising: a mechanical acoustic transducer comprising a metal plate; and an induction motor, wherein the induction motor facilitates excitation of the metal plate to produce an acoustic signal.

29. A mechanical acoustic transducer according to claim 28, wherein the metal plate comprises nickel, copper or aluminum.

30. A mechanical acoustic transducer according to claim 28, wherein the metal plate comprises aluminum.

31. A mechanical acoustic transducer according to claim 20 comprising a sonar transmitter and a sonar receiver, the sonar transmitter being mounted in a housing, wherein the sonar transmitter is isolated from vibrations of the housing.

32. A mechanical acoustic transducer according to claim 31, wherein the housing is watertight.

33. A mechanical acoustic transducer according to claim 31, wherein a water pressure on the housing is equal to a pressure inside the housing.

* * * * *